United States Patent
Tanimura et al.

(10) Patent No.: US 9,356,689 B2
(45) Date of Patent: May 31, 2016

(54) OPTICAL TRANSMITTER AND OPTICAL SIGNAL TRANSMISSION METHOD

(71) Applicant: FUJITSU LIMITED, Kawasaki-shi, Kanagawa (JP)

(72) Inventors: Takahito Tanimura, Kawasaki (JP); Takeshi Hoshida, Kawasaki (JP); Masato Nishihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 80 days.

(21) Appl. No.: 13/946,662

(22) Filed: Jul. 19, 2013

(65) Prior Publication Data

US 2013/0302031 A1 Nov. 14, 2013

Related U.S. Application Data

(63) Continuation of application No. PCT/JP2011/051969, filed on Jan. 31, 2011.

(51) Int. Cl.
*H04B 10/07* (2013.01)
*H04B 10/50* (2013.01)

(52) U.S. Cl.
CPC ............ *H04B 10/07* (2013.01); *H04B 10/5057* (2013.01); *H04B 10/50575* (2013.01)

(58) Field of Classification Search
CPC ...................................................... H04B 10/07
See application file for complete search history.

(56) References Cited

U.S. PATENT DOCUMENTS

| | | | |
|---|---|---|---|
| 2004/0197103 A1 | 10/2004 | Roberts | |
| 2005/0030884 A1* | 2/2005 | Kim | H04B 3/23 370/201 |
| 2005/0089326 A1* | 4/2005 | Regev | H04B 10/0775 398/32 |
| 2006/0263098 A1* | 11/2006 | Akiyama | G02F 1/0123 398/188 |
| 2007/0003179 A1 | 1/2007 | Tanimura | |
| 2007/0065162 A1* | 3/2007 | Kikuchi | H04B 10/2507 398/208 |
| 2010/0202774 A1* | 8/2010 | Yu | H04J 14/0282 398/49 |
| 2010/0209121 A1 | 8/2010 | Tanimura | |
| 2011/0170877 A1* | 7/2011 | Akiyama | G02F 1/2255 398/185 |
| 2011/0249978 A1 | 10/2011 | Sasaki | |
| 2011/0255876 A1* | 10/2011 | Sugihara | H04B 10/5053 398/188 |

FOREIGN PATENT DOCUMENTS

| | | |
|---|---|---|
| JP | 8-051397 | 2/1996 |
| JP | 2006-522508 | 9/2006 |
| JP | 2007-006326 | 1/2007 |

(Continued)

OTHER PUBLICATIONS

Notification of Transmittal of Translation of the International Preliminary Report on Patentability (Form PCT/IB/338, Form PCT/IB/373 & Form PCT/ISA/237), PCT/JP2011/051969, 6 pages, dated Aug. 15, 2013.
JPOA—Office Action of Japanese Patent Application No. 2012-555605 dated Jul. 22, 2014 with English Translation of the Office Action.
International Search Report, mailed in connection with PCT/JP2011/051969 and mailed Mar. 1, 2011.

(Continued)

*Primary Examiner* — David Payne
*Assistant Examiner* — Omar S Ismail
(74) *Attorney, Agent, or Firm* — Fujitsu Patent Center

(57) ABSTRACT

An optical transmitter includes: an optical modulator configured to generate an optical signal from a plurality of transmission signals; a crosstalk monitor configured to monitor crosstalk between the plurality of transmission signals by using the optical signal; and a crosstalk canceller configured to correct the plurality of transmission signals based on a result of monitoring by the crosstalk monitor.

11 Claims, 19 Drawing Sheets

(56) References Cited

FOREIGN PATENT DOCUMENTS

| | | |
|---|---|---|
| JP | 2007-267001 | 10/2007 |
| JP | 2010-118925 | 5/2010 |
| JP | 2010-166376 | 7/2010 |
| JP | 2010-193204 | 9/2010 |
| WO | 2010/073990 | 7/2010 |

OTHER PUBLICATIONS

CNOA—Office Action dated May 5, 2015 issued for Chinese Patent Application No. 201180065991.6, with full English translation.
CNOA—Second Notification of Office Action dated Nov. 26, 2015 issued in the corresponding Chinese patent application No. 201180065991.6.

* cited by examiner

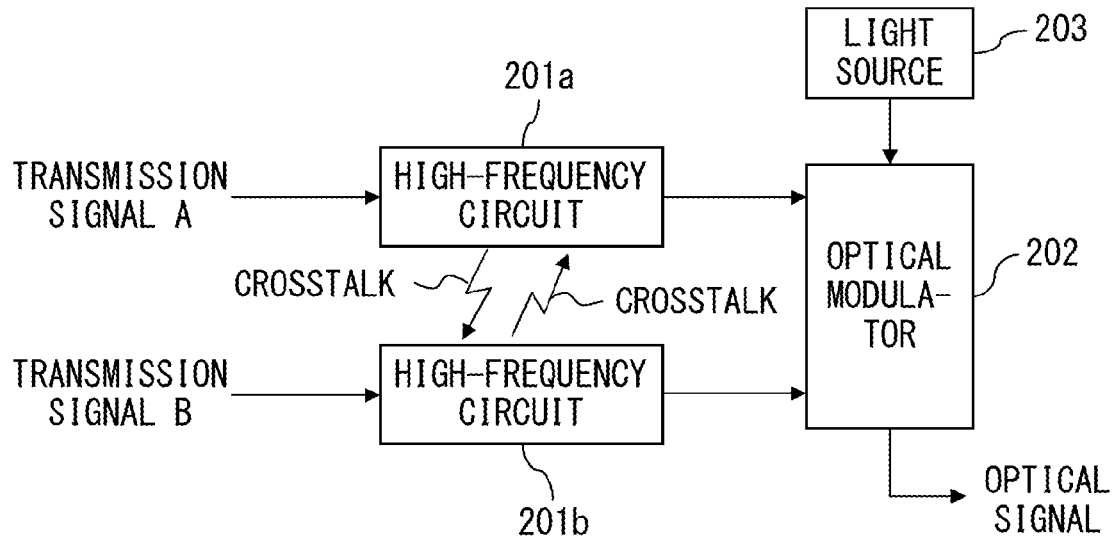
F I G. 1 A
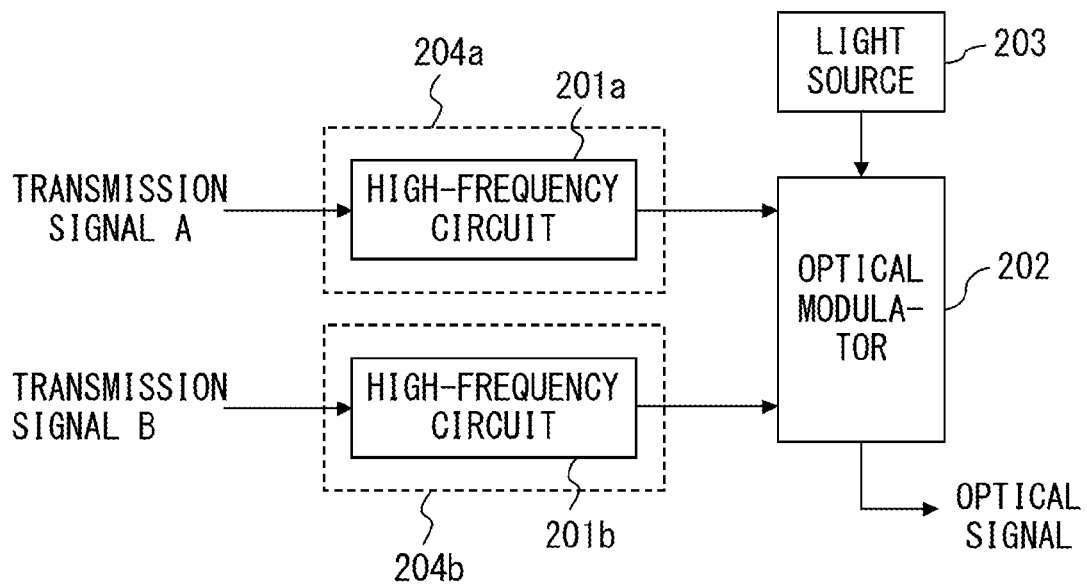
F I G. 1 B

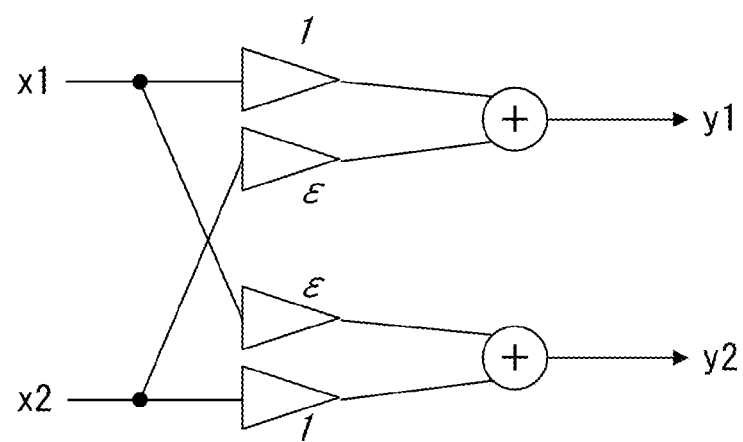
F I G. 4

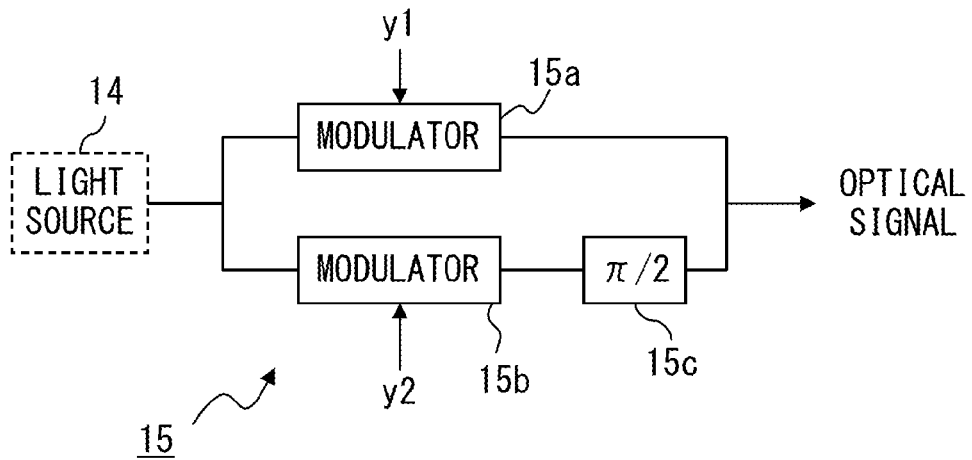
F I G. 5 A
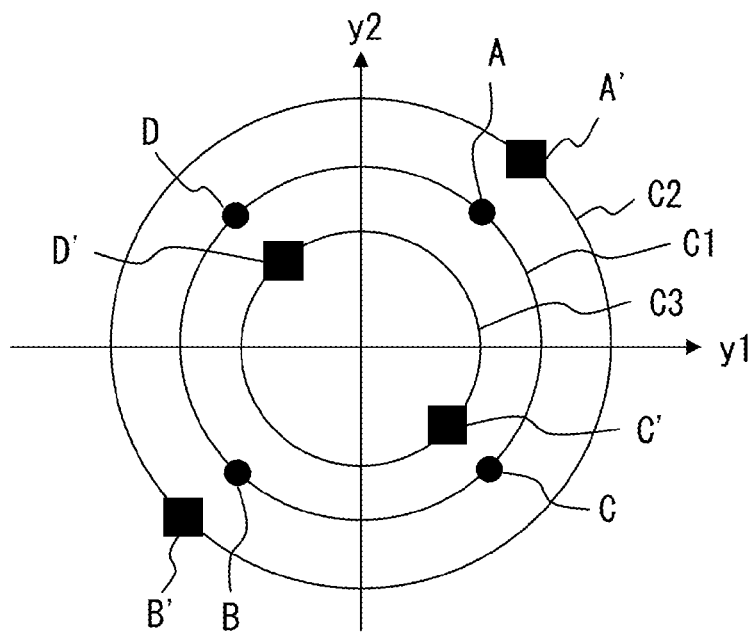
F I G. 5 B

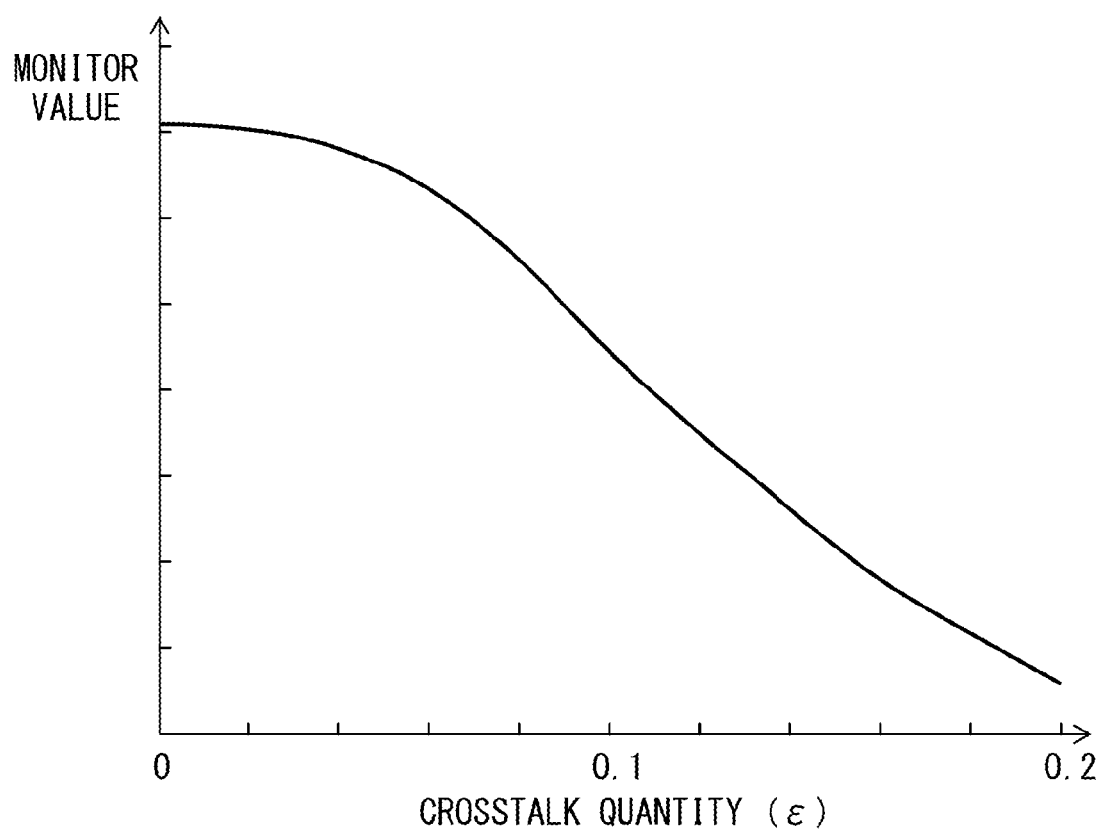
F I G. 8

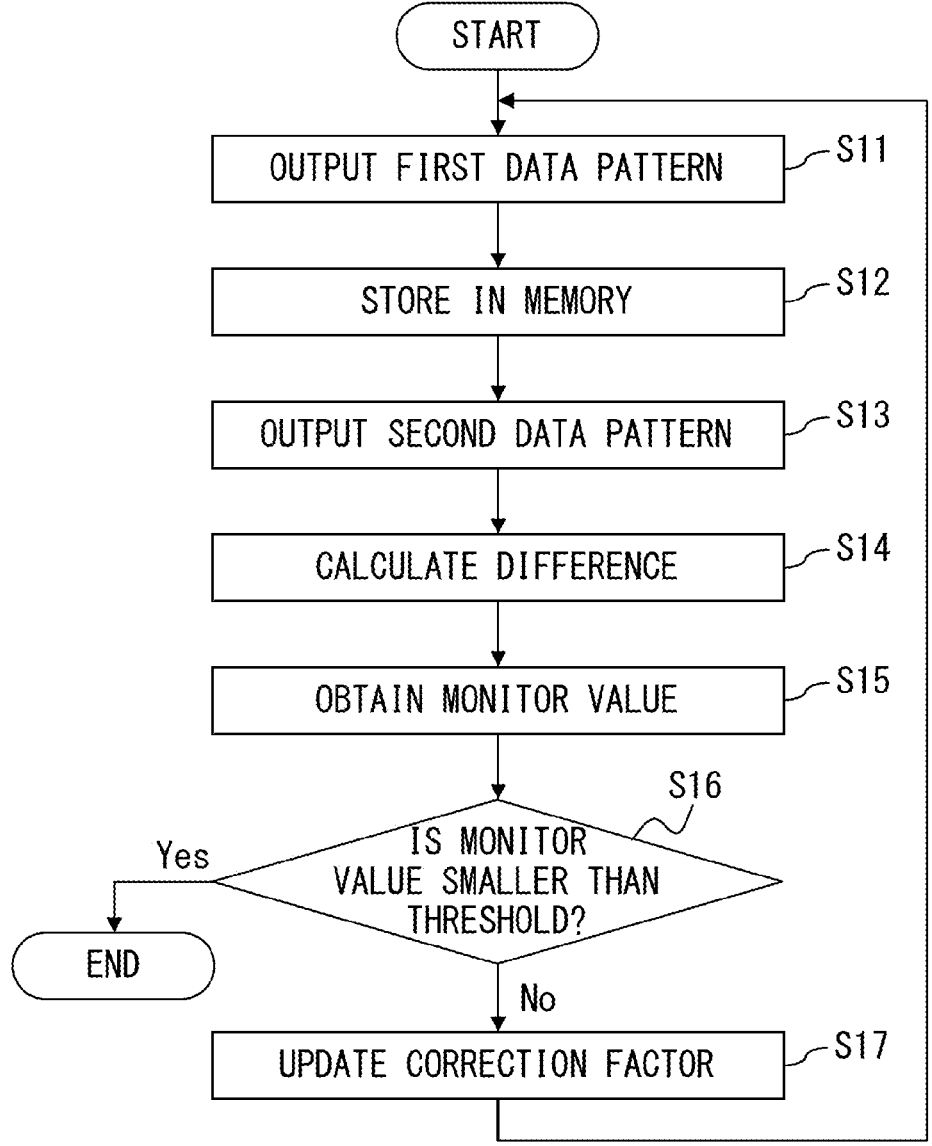
F I G. 1 4

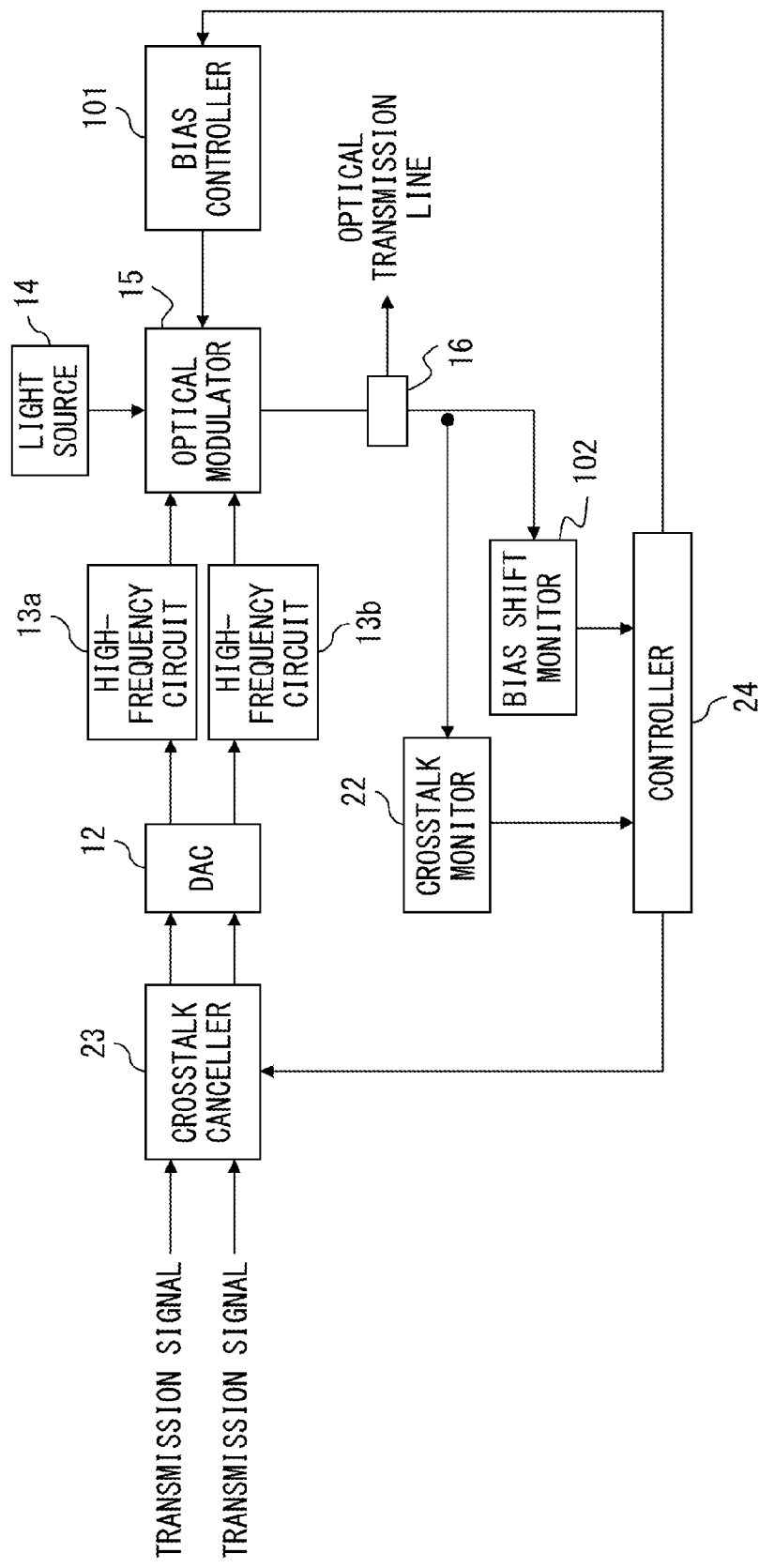
F I G. 17

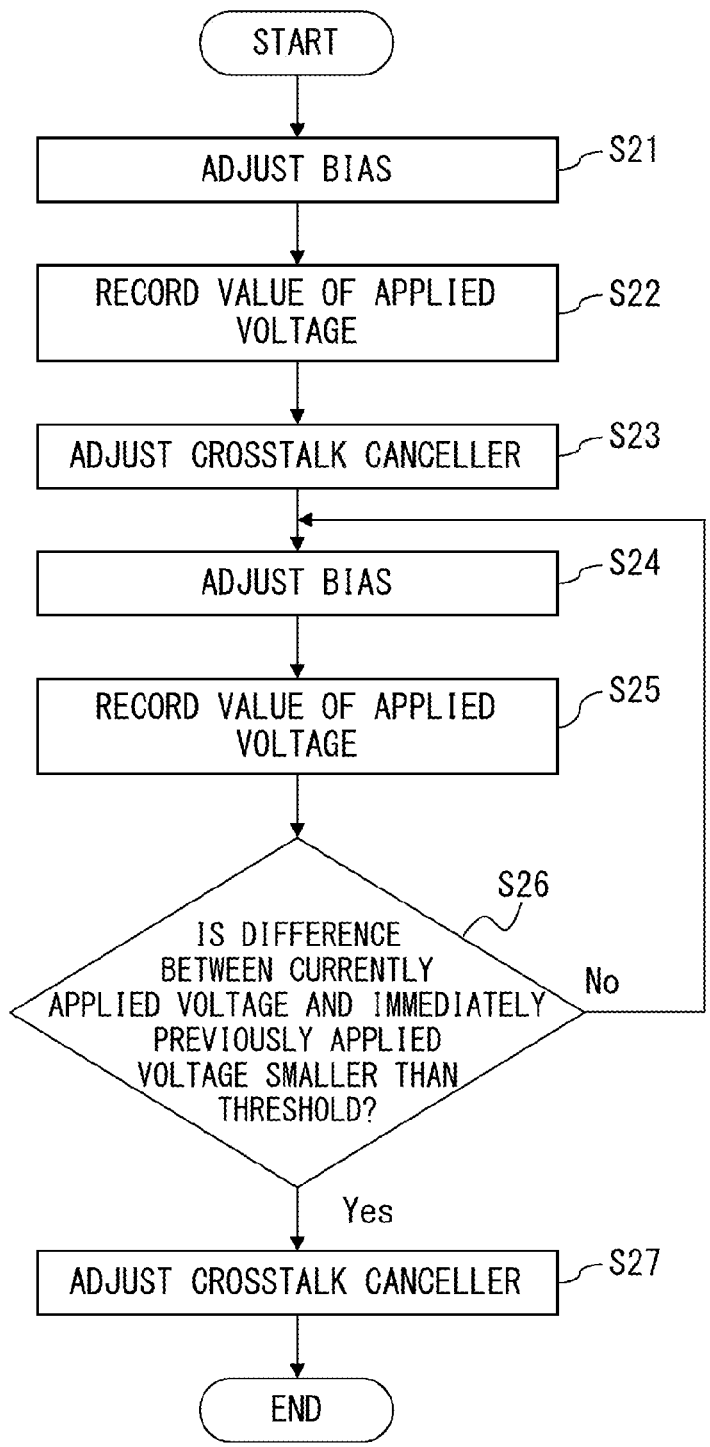
F I G. 1 8

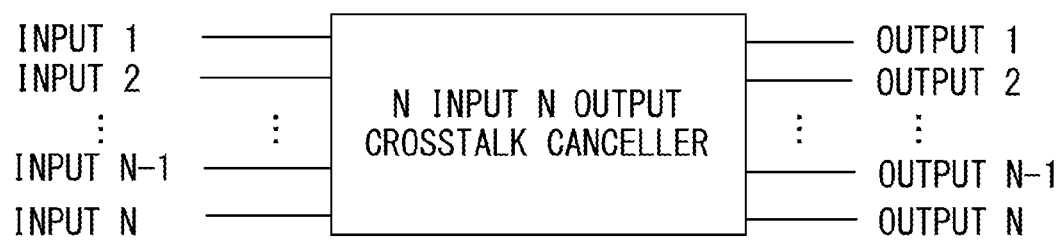
F I G. 1 9

OPTICAL TRANSMITTER AND OPTICAL SIGNAL TRANSMISSION METHOD

CROSS-REFERENCE TO RELATED APPLICATION

This application is a continuation application of International Application PCT/JP2011/051969 filed on Jan. 31, 2011 and designated the U.S., the entire contents of which are incorporated herein by reference.

FIELD

The embodiments discussed herein are related to an optical transmitter and an optical signal transmission method that generate an optical signal from a plurality of transmission signals and transmit the optical signal.

BACKGROUND

In recent years, in the field of core networks, a technique of realizing high-speed transmission that exceeds several hundred Gbit/s or 1 Tbit/s for each wavelength has been studied. This technique includes, for example, optical OFDM (Optical Orthogonal Frequency Division Multiplexing), SuperChannel, and the like.

In order to realize a high-speed transmission such as the above, an optical transmitter performs a parallel operation of generating an optical signal from a plurality of transmission signals as illustrated in, for example, FIG. 1A. In this example, the optical transmitter illustrated in FIG. 1A includes high-frequency circuits 201a and 201b, an optical modulator 202, and a light source 203.

Transmission signals A and B are input to the high-frequency circuits 201a and 201b, respectively. Transmission signals A and B are electric signals, and are generated from transmission data strings. The high-frequency circuits 201a and 201b include, for example, an amplifier, a filter, and a wiring pattern. The wiring pattern is a conductor pattern formed on a printed circuit board to propagate electric signals. The high-frequency circuits 201a and 201b respectively generate, from transmission signals A and B, driving signals for driving the optical modulator 202. The optical modulator 202 modulates a continuous wave generated by the light source 203 with the driving signals to generate an optical signal.

As described above, the optical transmitter illustrated in FIG. 1A generates an optical signal from a plurality of transmission signals, and transmits the optical signal. Although an optical signal is generated from two transmission signals in the example of FIG. 1A, an optical transmitter that generates an optical signal from more transmission signals (or more electric signals) has been implemented in practical use. Configurations using a greater number of transmission signals are capable of achieving higher transmission rate.

Meanwhile, the demand for downsizing of an optical transmission equipment has further increased in recent years. Accordingly, downsizing and/or integration is important for an optical transmitter (or an optical transceiver module that includes an optical transmitter) that is installed in the optical transmission equipment.

However, downsizing of an optical transmitter causes an increase in electromagnetic crosstalk in the optical transmitter. In the optical transmitter illustrated in FIG. 1A for example, the distance between the high-frequency circuits 201a and 201b is reduced, and crosstalk between the high-frequency circuits 201a and 201b increases. In other words, there is a possibility that downsizing of an optical transmitter will cause deterioration of transmission performance. Further, electromagnetic crosstalk may occur not only between the high-frequency circuits 201a and 201b but also in the optical modulator 202. For example, electromagnetic crosstalk may occur between electrodes for transmitting high-frequency signals in the optical modulator 202.

The above described crosstalk is suppressed by shielding the high-frequency circuits 201a and 201b electromagnetically by using shields 204a and 204b, respectively, as illustrated in, for example, FIG. 1B. However, configurations of using electromagnetic shields for suppressing crosstalk prevent the downsizing of optical transmitters. Also, it may be difficult to electromagnetically shield crosstalk in the optical modulator 202.

As described above, downsizing of an optical transmitter that generates an optical signal from a plurality of transmission signals increases crosstalk between the transmission signals in the optical transmitter. And, increases in crosstalk in an optical transmitter may deteriorate the transmission performance.

As a related art, a technique of compensating for skew that occurs on the path of each channel is proposed (Japanese Laid-open Patent Publication No. 2010-193204, for example).

SUMMARY

According to an aspect of the embodiments, an optical transmitter includes: an optical modulator configured to generate an optical signal from a plurality of transmission signals; a crosstalk monitor configured to monitor crosstalk between the plurality of transmission signals by using the optical signal; and a crosstalk canceller configured to correct the plurality of transmission signals based on a result of monitoring by the crosstalk monitor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1A and 1B explain problems caused by downsizing of an optical transmitter;

FIG. 4 illustrates a crosstalk model;

FIGS. 5A and 5B explain deteriorations of optical signals caused by crosstalk;

FIG. 8 illustrates results of simulation of monitor values with respect to crosstalk quantities;

FIG. 14 is a flowchart illustrating a method of controlling the crosstalk canceller in the optical transmitter illustrated in FIG. 13;

FIG. 17 illustrates a configuration of an optical transmitter having a function of adjusting a crosstalk canceller and an optical modulator;

FIG. 18 is a flowchart illustrating a method of adjusting the crosstalk canceller and the optical modulator; and FIG. 19 explains an N-input N-output crosstalk canceller.

DESCRIPTION OF EMBODIMENTS

Figure 2A:
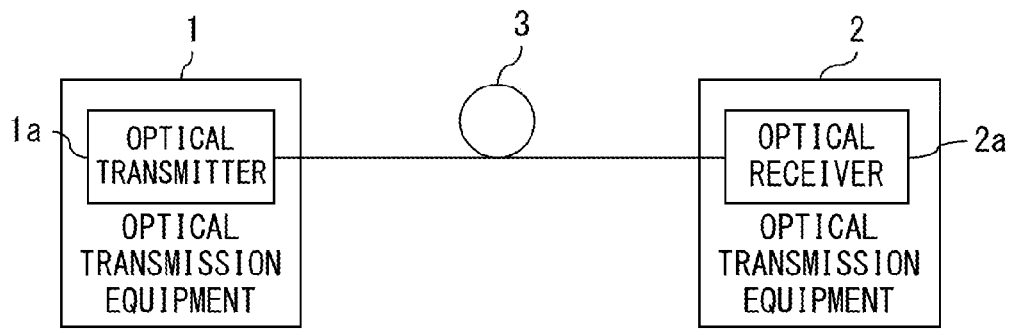
FIGS. 2A and 2B illustrate optical transmission systems to which an optical transmitter according to the embodiments is applied.
Figure 2B:
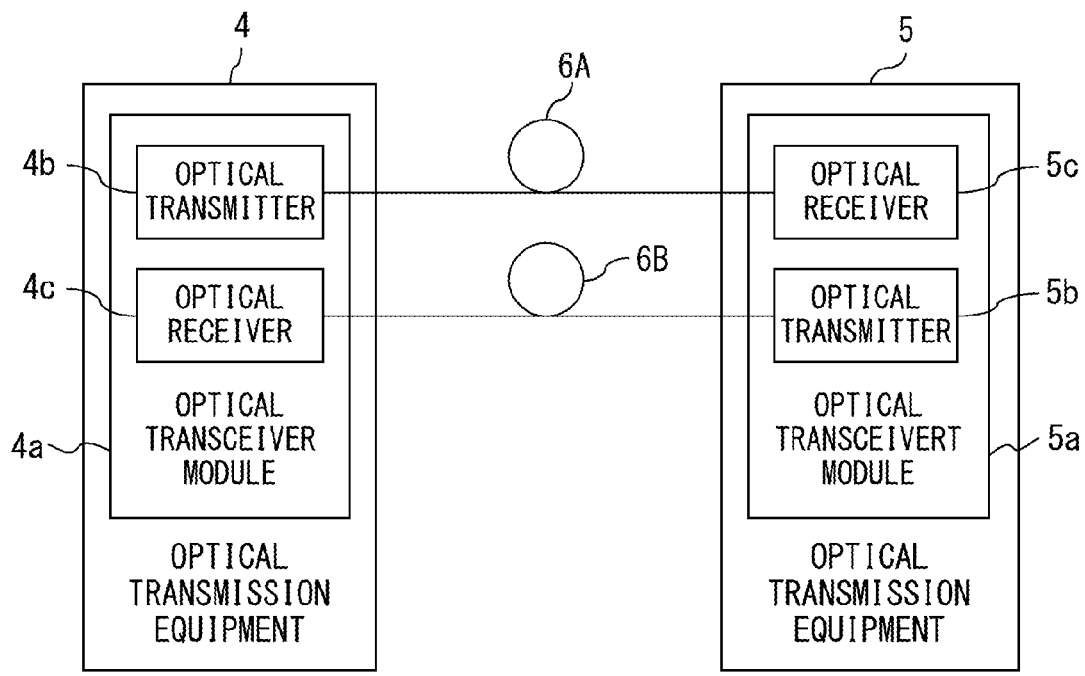

FIGS. 2A and 2B illustrate examples of optical transmission systems in which an optical transmitter according to the embodiments is used. The optical transmission system illustrated in FIG. 2A includes optical transmission equipments 1 and 2. The optical transmission equipments 1 and 2 are connected to each other through an optical transmission line 3. The optical transmission line 3 may be an optical fiber cable. The optical transmission system may have one or a plurality of relay nodes on the optical transmission line 3. The optical transmission equipment 1 includes an optical transmitter 1a, and the optical transmission equipment 2 includes an optical receiver 2a. The optical transmitter 1a generates an optical signal for carrying data, and outputs the optical signal to the optical transmission line 3. The optical receiver 2a receives, through the optical transmission line 3, the optical signal transmitted from the optical transmitter 1a.

The optical transmission system illustrated in FIG. 2B includes optical transmission equipments 4 and 5. The optical transmission equipments 4 and 5 are connected to each other through a pair of optical transmission lines 6A and 6B. The optical transmission lines 6A and 6B may be optical fiber cables. The transmission system may have one or a plurality of relay nodes on each of the optical transmission lines 6A and 6B. The optical transmission equipment 4 includes an optical transceiver module 4a, and the optical transceiver module 4a includes an optical transmitter 4b and an optical receiver 4c. Similarly, the optical transmission equipment 5 includes an optical transceiver module 5a, and the optical transceiver module 5a includes an optical transmitter 5b and an optical receiver 5c. The optical transmitter 4b generates an optical signal for carrying data, and outputs the optical signal to the optical transmission line 6A. The optical receiver 5c receives, through the optical transmission line 6A, the optical signal transmitted from the optical transmitter 4b. Similarly, the optical transmitter 5b generates an optical signal for carrying data, and outputs the optical signal to the optical transmission line 6B. The optical receiver 4c receives, through the optical transmission line 6B, the optical signal transmitted from the optical transmitter 5b.

The optical transmission system illustrated in FIG. 2A or FIG. 2B may transmit WDM signals. Also, an optical transmission system according to an embodiment may employ polarization multiplexing. Further, an optical transmission system according to an embodiment may employ arbitrary modulation schemes (phase modulation, amplitude modulation, OFDM, etc.).

An optical transmitter according to an embodiment corresponds to the optical transmitter 1a in the optical transmission system illustrated in FIG. 2A and to optical transmitters 4b and 5b in the optical transmission system illustrated in FIG. 2B. Also, an optical transceiver module according to an embodiment corresponds to the optical transceiver modules 4a and 5a in the optical transmission system illustrated in FIG. 2B.

First Embodiment

Figure 3:
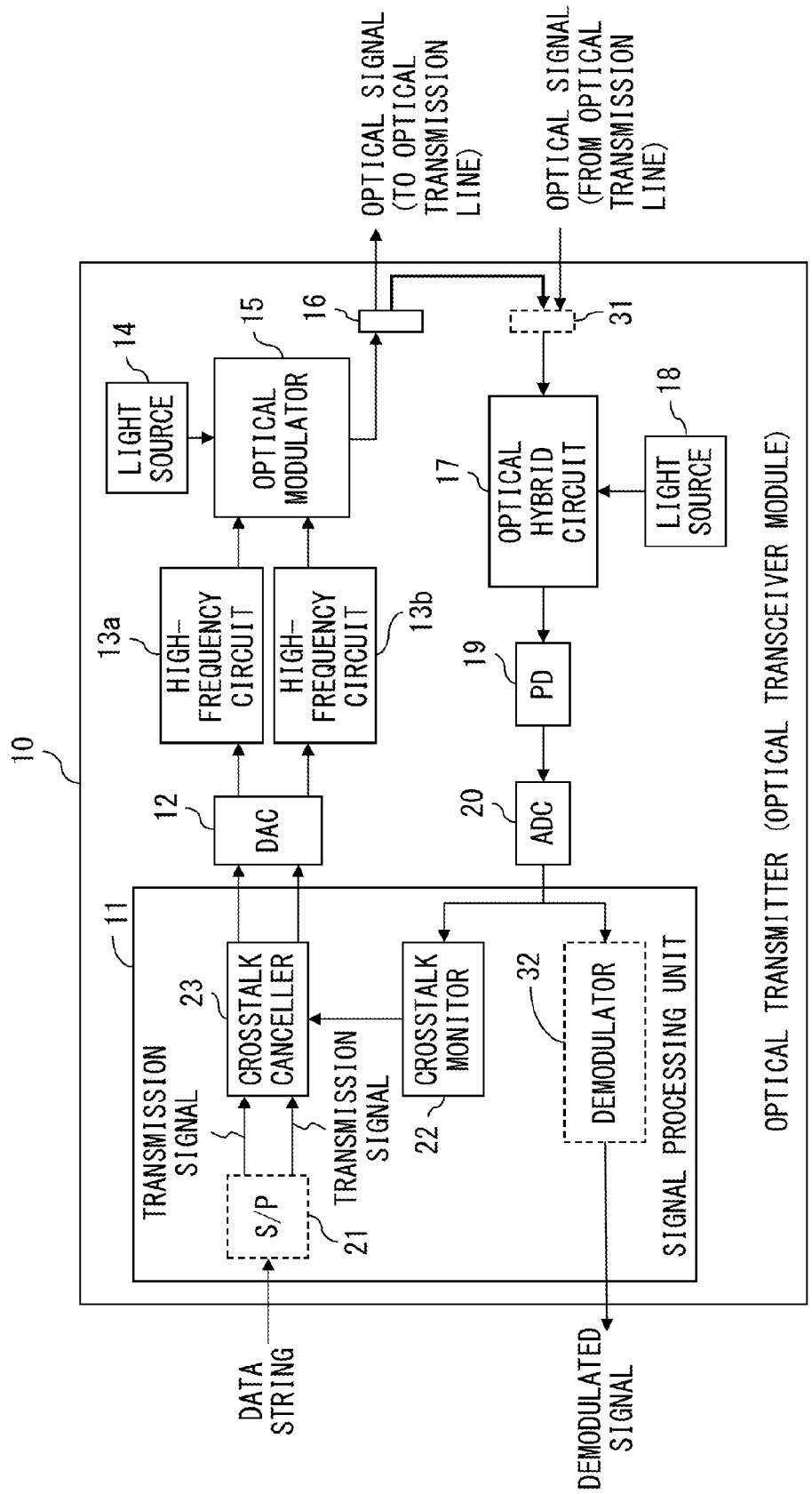
FIG. 3 illustrates a configuration of an optical transmitter according to the embodiments.

FIG. 3 illustrates a configuration of an optical transmitter according to an embodiment. An optical transmitter 10 according to the embodiment includes a signal processing unit 11, a D/A (Digital-to-Analog) conversion circuit 12, high-frequency circuits 13a and 13b, a light source 14, an optical modulator 15, an optical splitter 16, an optical hybrid circuit 17, a light source 18, a photo detector circuit 19, and an A/D (Analog-to-Digital) conversion circuit 20.

The optical transmitter 10 generates an optical signal from a plurality of transmission signals to transmit the optical signal. In this example, a plurality of transmission signals may be generated from one data string. In such a case, a plurality of transmission signals may be generated by, for example, converting a serial input data string into parallel data string. In the example illustrated in FIG. 3, a serial-parallel converter 21 is used for parallelizing an input data string so as to generate two transmission signals. Note that a plurality of transmission signals may be generated from independent data strings.

The signal processing unit 11 is implemented by, for example, a digital signal processor (DSP). Alternatively, the signal processing unit 11 may be implemented by a general-purpose processor, or may be implemented by a circuit (an FPGA, an ASIC, etc., for example) that provides a function equivalent to the DSP.

The signal processing unit 11 includes a crosstalk monitor 22 and a crosstalk canceller 23. The crosstalk monitor 22 monitors crosstalk between a plurality of transmission signals by using an optical signal that is generated and transmitted by the optical transmitter 10. The crosstalk canceller 23 corrects the plurality of transmission signals in accordance with results of monitoring by the crosstalk monitor 22. In this correction, the crosstalk canceller 23 corrects the plurality of transmission signals in such a manner that crosstalk between the plurality of transmission signals is reduced (or that desirably crosstalk between the plurality of transmission signals is minimized). "Correcting a plurality of transmission signals" is not limited to a process of correcting all transmission signals, but includes a process of correcting part of a plurality of transmission signals. Note that the serial-parallel converter 21 described above is implemented by the signal processing unit 11 in this example.

The D/A conversion circuit 12 converts a plurality of transmission signals output from the signal processing unit 11 into analog signals, respectively. In other words, a plurality of analog transmission signals are generated by the D/A conversion circuit 12. The D/A conversion circuit 12 includes, for example, a plurality of D/A converters that correspond to a plurality of transmission signals.

Each of the high-frequency circuits 13a and 13b has, for example, an amplifier, a filter, a wiring pattern, etc. The wiring pattern is a conductor pattern formed on a printed circuit board or in a modulator so as to propagate electric signals. In this case, a plurality of analog transmission signals generated by the D/A conversion circuit 12 are amplified and/or filtered by the high-frequency circuits 13a and 13b, respectively. The plurality of analog transmission signals output from the high-frequency circuits 13a and 13b are used in the optical modulator 15 as driving signals for generating modulated optical signals.

The light source 14 generates a continuous wave (CW). In this example, the oscillation frequency of the light source 14 belongs to, for example, the C band or the L band. The light source 14 is implemented by, for example, a laser diode (LD).

The optical modulator 15 modulates, with the driving signals, the continuous wave generated by the light source 14, and generates an optical signal. For generating the optical signal, the plurality of analog transmission signals output from the high-frequency circuits 13a and 13b are used as driving signals for modulating the continuous wave in the optical modulator 15. In other words, the optical modulator 15 generates an optical signal from a plurality of transmission signals. Thereafter, the optical transmitter 10 outputs the optical signal generated by the optical modulator 15 to an optical transmission line.

The optical splitter 16 splits the optical signal generated by the optical modulator 15, and guides the split portion of the optical signal to the optical hybrid circuit 17. The optical splitter 16 may be implemented by an optical coupler.

The optical hybrid circuit 17 uses local oscillation light generated by the light source 18 in order to generate an I-component (in-phase component) signal and a Q-component (quadrature component) signal from the optical signal generated by the optical modulator 15. In this example, the optical hybrid circuit 17 may include an optical splitter, a 90-degree phase shifter, and first and second mixers, although they are not illustrated in the drawings. The optical splitter splits input light (i.e., the optical signal generated by the optical modulator 15), and guides the light to the first and second mixers. The 90-degree phase shifter shifts the phase of the local oscillation light by 90 degrees. The first mixer mixes the input light and the local oscillation light so as to extract an I component of the optical signal generated by the optical modulator 15. The second mixer mixes the input light and the 90-degree-shifted local oscillation light so as to extract a Q component of the optical signal generated by the optical modulator 15. As described above, the optical hybrid circuit 17 operates as a front-end circuit of a coherent receiver.

The photo detector circuit (PD) 19 converts the I-component signal and the Q-component signal generated by the optical hybrid circuit 17 into electric signals, respectively. In other words, the photo detector circuit 19 outputs electric signals representing an I component and a Q component of the optical signal generated by the optical modulator 15. The A/D conversion circuit 20 converts a signal output from the photo detector circuit 19 into a digital signal. In other words, digital signals representing the I component and the Q component of the optical signal generated by the optical modulator 15 are fed to the signal processing unit 11. Meanwhile, the crosstalk monitor 22 monitors crosstalk between the plurality of transmission signals by using these digital signals.

The high-frequency circuits 13a and 13b may be arranged close to each other in order to downsize the optical transmitter 10. However, reduction in the distance between the high-frequency circuits 13a and 13b causes or increases crosstalk between transmission signals that pass through the high-frequency circuits 13a and 13b. Thus, the optical transmitter 10 monitors crosstalk between transmission signals by using the crosstalk monitor 22. The crosstalk canceller 23 corrects at least one of the transmission signals in accordance with results of the monitoring by the crosstalk monitor 22 in such a manner that crosstalk between the transmission signals is reduced. For example, the crosstalk canceller 23 supplies the inverse characteristics of crosstalk caused in the high-frequency circuits 13a and 13b, to the transmission signals. As a result of this, crosstalk between transmission signals is cancelled or suppressed.

The configuration illustrated in FIG. 3 may also be applied to an optical transceiver module. However, the optical transceiver module includes an optical switch 31 and a demodulator 32 in addition to the signal processing unit 11, the D/A conversion circuit 12, the high-frequency circuits 13a and 13b, the light source 14, the optical modulator 15, the optical splitter 16, the optical hybrid circuit 17, the light source 18, the photo detector circuit 19, and the A/D conversion circuit 20. The optical switch 31 selects an optical signal generated by the optical modulator 15 or an optical signal received through an optical transmission line. For example, the optical switch 31 selects an optical signal generated by the optical modulator 15 during a period in which states of the crosstalk canceller 23 are adjusted, and selects an optical signal received through a transmission line during other periods. The optical signal selected by the optical switch 31 is guided to the optical hybrid circuit 17.

A signal output from the A/D conversion circuit 20 is guided to the crosstalk monitor 22 during a period in which states of the crosstalk canceller 23 are adjusted, and is guided to the demodulator 32 during other periods. In other words, during a period in which states of the crosstalk canceller 23 are adjusted, a digital signal representing an optical signal generated by the optical modulator 15 is supplied to the crosstalk monitor 22. During other periods, a digital signal representing an optical signal received through an optical transmission line is supplied to the demodulator 32. Alternatively, it is possible to halt the operation of the demodulator 32 during a period in which states of the crosstalk canceller 23 are adjusted, and to halt the operation of the crosstalk monitor 22 during other periods.

The demodulator 32 recovers symbols from a digital signal representing an optical signal received through an optical transmission line. The demodulator 32 may perform a process of compensating for factors (chromatic dispersion, etc.) that deteriorate a quality of an optical signal.

In the optical transceiver module, the signal processing unit 11 (the crosstalk monitor 22 and the crosstalk canceller 23), the D/A conversion circuit 12, the high-frequency circuits 13a and 13b, the light source 14, and the optical modulator 15 operate for the optical transmitter, while the signal processing unit 11 (demodulator 32), the optical hybrid circuit 17, the light source 18, the photo detector circuit 19, and the A/D conversion circuit 20 operate for the optical receiver. In such a case, the signal processing unit 11 is used for both the optical transmitter and the optical receiver. However, the optical transmitter and the optical receiver may respectively include a dedicated signal processing unit. In both configurations, the optical transceiver module may realize the cancellation of crosstalk by using a part of the optical receiver (the optical hybrid circuit 17, the light source 18, the photo detector circuit 19, and the A/D conversion circuit 20).

As described above, an optical transmitter (or an optical transceiver module) 10 according to an embodiment has a function of cancelling crosstalk between transmission signals. Accordingly, the quality of optical signals generated from a plurality of transmission signals by the optical transmitter (or the optical transceiver module) 10 is improved.

FIG. 4 illustrates a crosstalk model. In this example, crosstalk between two signals is discussed for simplicity. The input of the crosstalk model is x=(x1, x2), and the output of the crosstalk model is y=(y1, y2). The crosstalk model illustrated in FIG. 4 under this condition is expressed by the formula below.

$$y = H_c x$$

where $H_c$ is a crosstalk matrix below, while x and y are vectors, respectively.

$$H_c = \begin{pmatrix} 1 & \varepsilon \\ \varepsilon & 1 \end{pmatrix}$$

Therefore, the outputs of the crosstalk model are expressed by the formulas below.

$$y1 = x1 + \varepsilon x2$$

$$y2 = x2 + \varepsilon x1$$

In the above formulas, $\varepsilon$ is a parameter representing the strength of crosstalk, and satisfies $0 \leq \varepsilon < 1$. Accordingly, when $\varepsilon = 0$ (i.e., when there is no crosstalk), y1=x1 and y2=x2 are satisfied. When $0 < \varepsilon$, signal y1 is influenced by signal x2 while signal y2 is influenced by signal x1. In other words, crosstalk is caused.

FIGS. 5A and 5B explain deterioration of an optical signal caused by crosstalk. In this example, it is assumed that the optical modulator 15 generates a QPSK optical signal. In such a case, the optical modulator 15 includes a pair of modulators 15a and 15b, and a phase element 15c as illustrated in FIG. 5A. Continuous wave generated by the light source 14 is split and guided to the modulators 15a and 15b. The modulators 15a and 15b are, for example, LN modulators, respectively. The modulator 15a modulates the continuous wave with signal y1 to generate a first modulated optical signal. Similarly, the modulator 15b modulates the continuous wave with signal y2 to generate a second modulated optical signal. The phase element 15c provides a phase difference of π/2 between the first and second modulated optical signals. This configuration generates a QPSK optical signal that carries signals y1 and y2.

According to QPSK, each symbol carries 2-bit data. The explanations below are based on an assumption that each symbol (x1, x2) represents one of four data patterns described below.
Data A: (+1,+1)
Data B: (−1,−1)
Data C: (+1,−1)
Data D: (−1,+1)
In this case, symbol (y1, y2) output from the crosstalk model illustrated in FIG. 4 may be of the following patterns.
Data A: (1+ε,1+ε)
Data B: (−1−ε,−1−ε)
Data C: (1−ε,−1+ε)
Data D: (−1+ε,1−ε)

FIG. 5B illustrates a constellation of symbol (y1, y2) output from the crosstalk model. When crosstalk has not occurred (i.e., ε=0), data A is represented by signal point A. Similarly, data B through data D are represented by signal points B through D, respectively. Signal points A through D are arranged on circle C1.

The respective signal points in FIG. 5B represent the amplitudes and the phases of optical signals generated when the optical modulator 15 is driven by signals y1 and y2. The distances between the origin and the signal points correspond to the amplitudes of optical signals. In other words, when ε=0, the amplitudes of optical signals correspond to the radius of circle C1 regardless of data. Phases of optical signals are represented by an argument of a signal point.

In an environment where crosstalk may occur (i.e., when $0<\varepsilon$), data A output from the crosstalk model is represented by signal point A'. Similarly, data B through D are represented by signal points B' through D', respectively. In other words, when $0<\varepsilon$, the amplitudes of optical signals that represent data A and data B correspond to the radius of circle C2, and the amplitudes of optical signals that represent data C and data D correspond to the radius of circle C3.

Figure 6A:
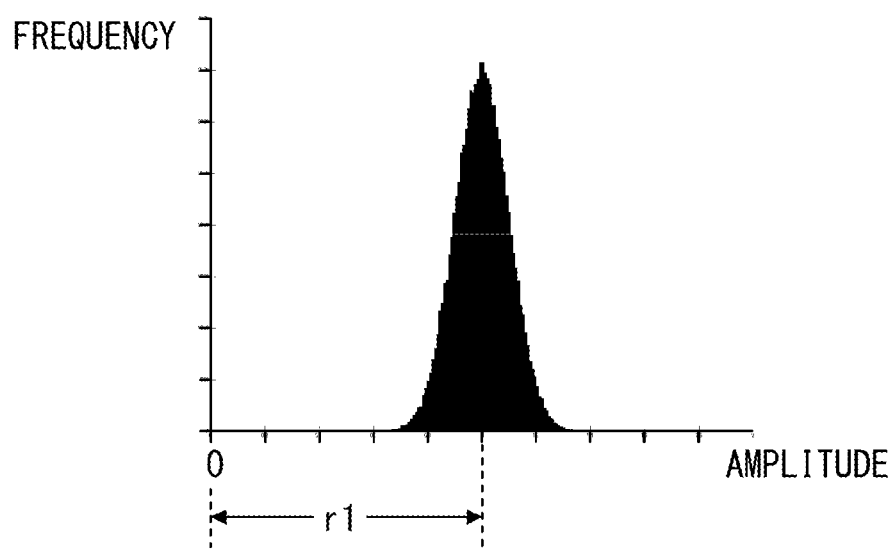
FIGS. 6A and 6B illustrate histograms depicting distribution of amplitudes of optical signals.
Figure 6B:
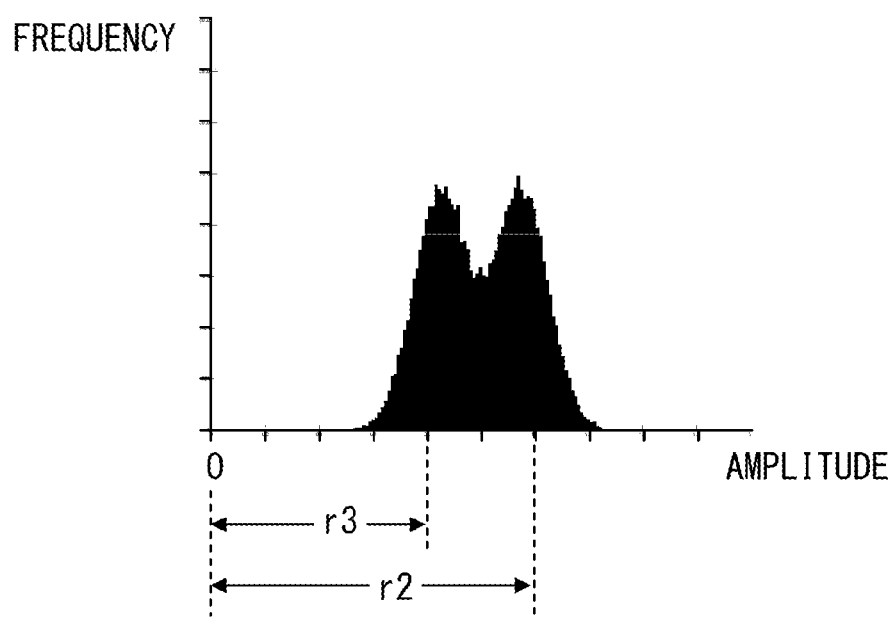

FIGS. 6A and 6B are histograms depicting distribution of amplitudes of optical signals. In FIGS. 6A and 6B, the horizontal axis represents amplitudes of optical signals, and the vertical axis represents occurrence frequencies.

As described above, when crosstalk does not exist, amplitudes of optical signals are consistent regardless of data, and correspond to radius r1 of circle C1. Accordingly, the distribution of amplitudes of optical signals has its peak at amplitude r1 as illustrated in FIG. 6A.

In an environment where crosstalk may occur, amplitudes of optical signals correspond to radius r2 of circle 2 or radius r3 of circle C3, depending upon the values of data, as described above. Accordingly, the distribution of amplitudes of optical signals has a peak at r2, which is greater than r1, and also has a peak at r3, which is smaller than r1, as illustrated in FIG. 6B. In other words, the distribution of amplitudes of optical signals has two peaks.

As described above, the statistics (the distribution of amplitudes of optical signals in the example illustrated in FIGS. 6A and 6B) of optical signals generated by the optical modulator 15 depend upon crosstalk between a plurality of signals used for generating the optical signals. In other words, crosstalk may be detected (or estimated) based on the distribution of amplitudes of optical signals generated by the optical modulator 15.

Accordingly, in the optical transmitter 10 of the embodiment, the crosstalk monitor 22 calculates the statistics of the optical signal generated by the optical modulator 15 so as to monitor crosstalk between transmission signals. The crosstalk canceller 23 corrects at least one of the transmission signals based on results of the monitoring by the crosstalk monitor 22 in such a manner that crosstalk is cancelled or reduced. As a result of this, crosstalk between transmission signals is cancelled or suppressed.

Figure 7:
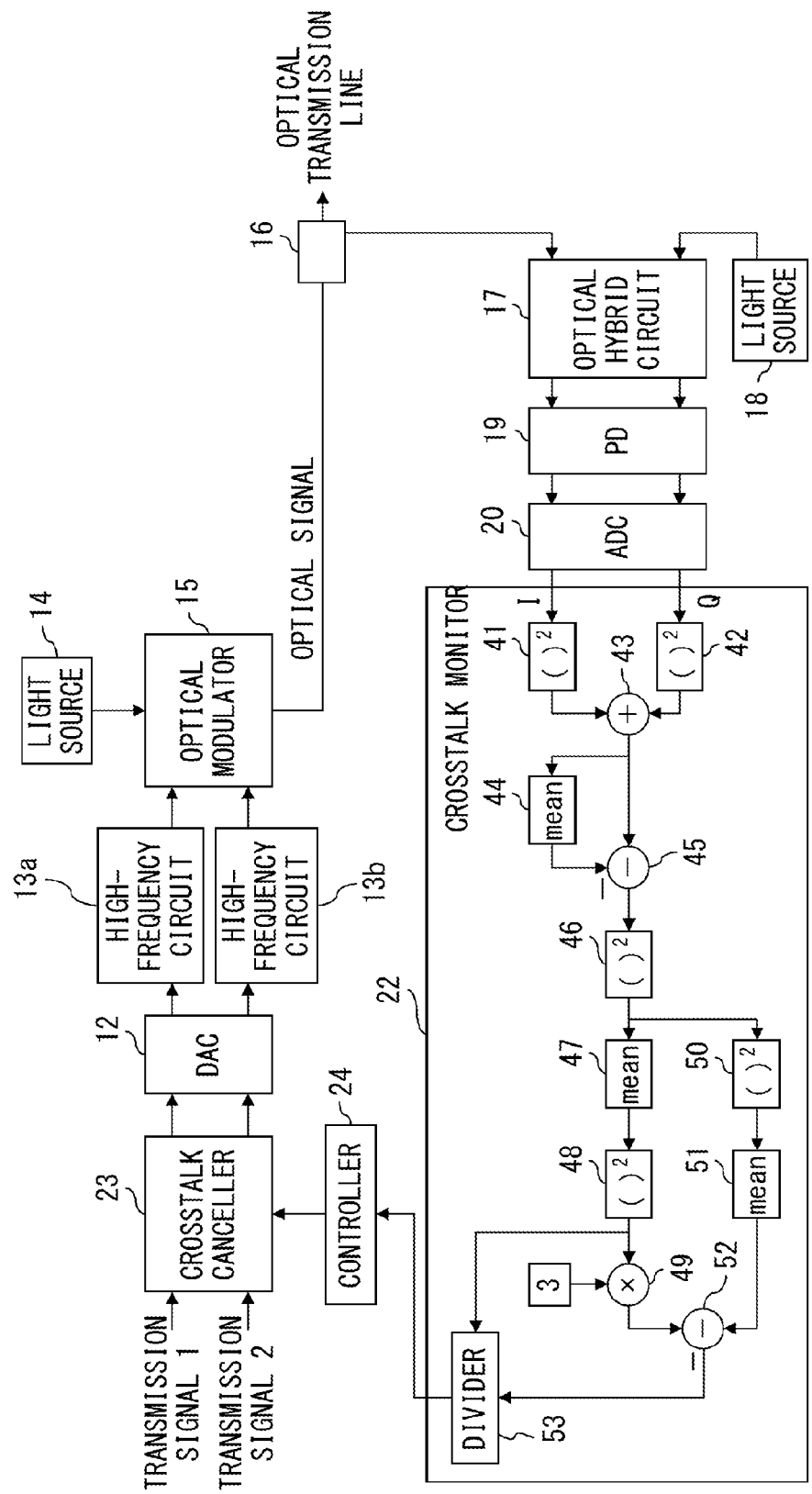
FIG. 7 illustrates a configuration of a crosstalk monitor and operations of controlling a crosstalk canceller.

FIG. 7 illustrates a configuration of the crosstalk monitor 22 and operations of controlling the crosstalk canceller 23. In this example, it is assumed that the optical transmitter 10 generates an optical signal from two transmission signals. In other words, two transmission signals are input to the crosstalk canceller 23. The two transmission signals input to the crosstalk canceller 23 may be signals that were generated from one data string or may be signals that were generated from different respective data strings.

The optical signal generated by the optical modulator 15 is split by the optical splitter 16, and is guided to the optical hybrid circuit 17. Thereafter, as described above, the optical hybrid circuit 17, the photo detector circuit 19, and the A/D conversion circuit 20 generate digital signals that represent I component and Q component of the optical signal generated by the optical modulator 15. In other words, digital signals representing the I component and the Q component of each symbol of the optical signal generated by the optical modulator 15 are input to the crosstalk monitor 22.

The crosstalk monitor 22 generates a monitor signal representing the statistics of the optical signal based on I component and Q component of the optical signal generated by the optical modulator 15. The statistics of the optical signal may be used for detecting or estimating crosstalk between transmission signals as described above. In other words, the monitor signal represents crosstalk between transmission signals.

A controller 24 controls the crosstalk canceller 23 based on the monitor signal generated by the crosstalk monitor 22. In this control, the controller 24 controls the controller 24 in such a manner that the monitor signal becomes closer to a target value. The target value is determined in such a manner that crosstalk is minimized or crosstalk is made to be smaller than a specified level. Also, the target value is determined in accordance with statistics represented by the monitor signal. Note that although the controller 24 is omitted in FIG. 3, it is provided, for example, in the signal processing unit 11. Also, the controller 24 may be implemented as part of the crosstalk monitor 22 or the crosstalk canceller 23.

The crosstalk canceller 23 corrects each or at least one of transmission signals in accordance with the control by the controller 24. In other words, each or at least one of transmission signals is corrected in such a manner that crosstalk occurring in the optical transmitter 10 is cancelled. Accordingly, even when crosstalk occurs between, for example, the high-frequency circuit 13a and 13b, the optical modulator 15 generates an optical signal by using electric signals for which influence by the crosstalk has been removed or suppressed. A configuration and operations of the crosstalk canceller 23 will be explained later.

In the example illustrated in FIG. 7, as the statistic of an optical signal generated by the optical modulator 15, the kurtosis of the distribution of amplitudes or power of the optical signal is used. A kurtosis represents the degree of sharpness of distribution. When a kurtosis is high, there is a concentration of data at the center, representing that the distribution is sharp. When a kurtosis is low, there is a dispersion of data, representing that the distribution is wide. The power of an optical signal is equal to the square of the amplitude of the optical signal. Accordingly, the amplitude distribution of an optical signal and the power distribution of the optical signal are similar to each other. In the explanations below, "amplitude of an optical signal" may include the power of the optical signal.

Monitor signal M, which represents the kurtosis of the amplitude distribution of optical signals, is obtained by the formula below:

$$M = \frac{u - 3s^4}{s^4}$$

$$u = \frac{1}{N}\sum_{i=1}^{N}(x_i - \bar{x})^4$$

$$\bar{x} = \frac{1}{N}\sum_{i=1}^{N}x_i$$

$$s^2 = \frac{1}{N}\sum_{i=1}^{N}(x_i - \bar{x})^2$$

where $x_i$ represents the amplitude (or the power) of symbol i of optical signal. In other words, $x_i$ is obtained by the sum of a square of I component and a square of Q component of symbol i of the optical signal. $\bar{x}$ represents the average of $x_i$.

In a case where the crosstalk monitor 22 generates monitor signal M, representing the kurtosis of the amplitude distribution of the optical signal, the crosstalk monitor 22 includes squarers 41 and 42, an adder 43, an averaging device 44, a subtractor 45, a squarer 46, an averaging device 47, a squarer 48, a multiplier 49, a squarer 50, an averaging device 51, a subtractor 52, and a divider 53.

The squarer 41 calculates the square of an I component of the optical signal for each symbol. The squarer 42 calculates the square of a Q component of the optical signal for each symbol. The adder 43 calculates the sum of signals output from the squarers 41 and 42 for each symbol. Output from the adder 43 corresponds to $x_i$.

The averaging device 44 calculates the average of signals output from the adder 43. The average is calculated from, for example, $x_i$ (i=1 through N) obtained for N symbols. The subtractor 45 subtracts a signal output from the averaging device 44 from a signal output from the adder 43 for each symbol. The squarer 46 calculates the square of a signal output from the subtractor 45 for each symbol.

The averaging device 47 calculates the average of signals output from the squarer 46. In this example, output from the averaging device 47 corresponds to $s^2$. The squarer 48 calculates the square of a signal output from the averaging device 47. In other words, output from the squarer 48 corresponds to $s^4$. Further, the multiplier 49 multiplies "3" by a signal output from the squarer 48.

The squarer 50 calculates the square of a signal output from the squarer 46. The averaging device 51 calculates the average of signals output from the squarer 50. Output from the averaging device 51 corresponds to "u". The subtractor 52 subtracts a signal output from the multiplier 49 from a signal output from the averaging device 51. Thereby, "u−3s⁴" is obtained.

The divider 53 divides a signal output from the subtractor 52 by a signal output from the squarer 48. In other words, the divider 53 calculates "(u−3s⁴)/s⁴". The crosstalk monitor 22 outputs the result of the calculation by the divider 53 as monitor signal M.

FIG. 8 illustrates results of simulation of monitor values with respect to crosstalk quantities. This simulation represents monitor signal M with respect to crosstalk quantities ε in the crosstalk model illustrated in FIG. 4. The monitor value represents the value of monitor signal M.

When crosstalk quantity ε is zero as illustrated in FIG. 8, the monitor value is the maximum. When crosstalk quantities ε increase, the monitor values decrease. However, in a region with smaller crosstalk quantity ε, the slope of the monitor values with respect to crosstalk quantities ε is moderate. Note that FIG. 6A illustrates the amplitude distribution of the optical signal when ε=0, and FIG. 6B illustrates the amplitude distribution of the optical signal when ε=0.15. As is obvious from FIG. 6A and FIG. 6B, when crosstalk quantity ε is small, the amplitude distribution of the optical signal is sharper. In other words, when crosstalk quantity ε is small, the kurtosis, represented by monitor signal M, is high.

The controller 24 controls the crosstalk canceller 23 by using the above characteristics. In other words, the controller 24 controls the crosstalk canceller 23 in such a manner that monitor signal M output from the crosstalk monitor 22 is maximized. Alternatively, the controller 24 controls the crosstalk canceller 23 in such a manner that monitor signal M exceeds a specified threshold. In such a case, the threshold is determined to be a value that is smaller than the maximum value of monitor signal M and is close to the maximum value of monitor signal M. As a result of this, crosstalk between transmission signals is cancelled or suppressed.

Figure 9:
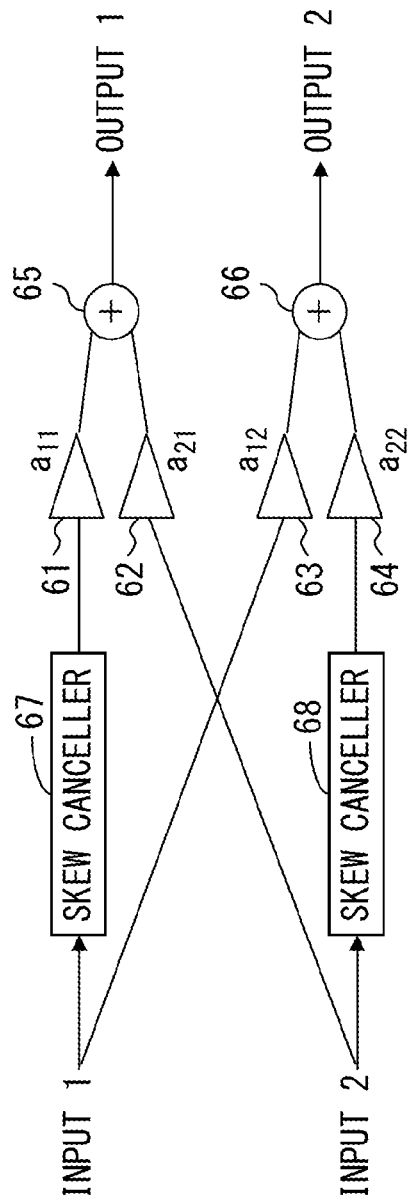
FIG. 9 illustrates a configuration of the crosstalk canceller.

FIG. 9 illustrates a configuration of the crosstalk canceller 23. This example is based on an assumption that the optical transmitter 10 generates an optical signal from two transmission signals. In such a case, two transmission signals (input signal 1 and input signal 2) are input to the crosstalk canceller 23.

The crosstalk canceller 23 includes multipliers 61 through 64 and adders 65 and 66. The multiplier 61 multiplies input signal 1 by a correction factor a11. The multiplier 62 multiplies input signal 2 by a correction factor a21. The multiplier 63 multiples input signal 1 by a correction factor a12. The multiplier 64 multiples input signal 2 by a correction factor a22. The correction factors a11, a21, a12 and a22 are zero or positive values. In addition, correction factors a11, a21, a12 and a22 are determined by the controller 24 based on monitor signal M. Note that when crosstalk is small, the correction factors a11 and a22 are controlled so that each of them becomes close to "1", and correction factors a21 and a12 are controlled so that each of them becomes close to zero.

The adder 65 calculates the sum of the multiplication results by the multipliers 61 and 62. The result of the calculation (output signal 1) obtained by the adder 65 represents corrected input signal 1, which is corrected by the crosstalk canceller 23. Similarly, the adder 66 calculates the sum of the multiplication results by the multipliers 63 and 64. The result of the calculation (output signal 2) obtained by the adder 66 represents corrected input signal 2, which is corrected by the crosstalk canceller 23.

The crosstalk canceller 23 may include skew cancellers 67 and 68. Skew (a difference in delay time between signals in this example) is caused by, for example, differences in the length of electric signal lines for propagating respective transmission signals, variations in the characteristics of amplifiers for amplifying respective transmission signals, etc. The skew cancellers 67 and 68 compensate for skew between transmission signals. The skew cancellers 67 and 68 are implemented by, for example, FIR filters. In such a case, the coefficients of a FIR filter are controlled by a known technique.

Figure 10:
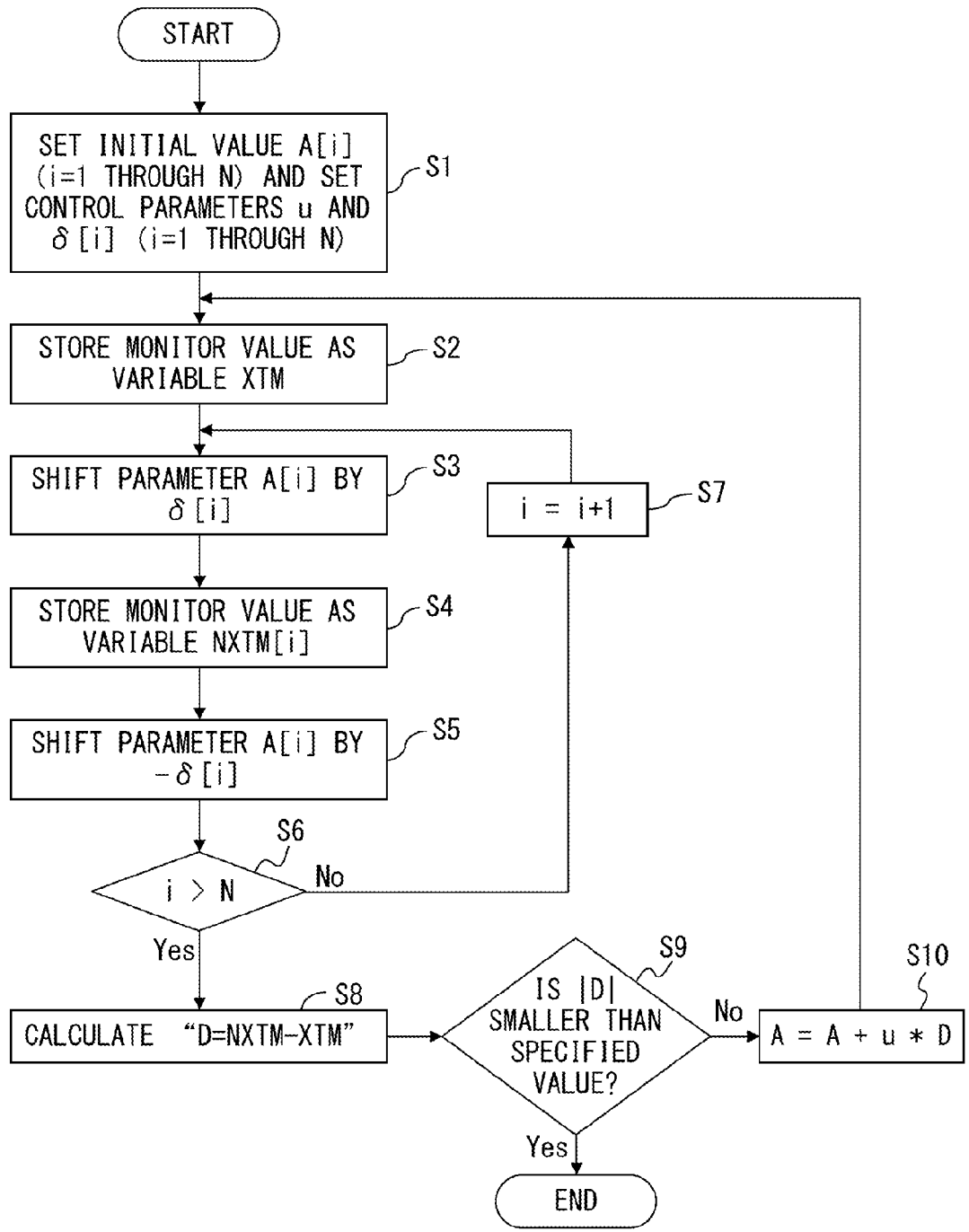
FIG. 10 is a flowchart illustrating a method of controlling the crosstalk canceller.

FIG. 10 is a flowchart illustrating a method of controlling the crosstalk canceller 23. The process of this flowchart is executed by the controller 24. The controller 24 executes the process of this flowchart so as to determine an operation status of the crosstalk canceller 23, for example before the optical transmitter 10 transmits data addressed to a receiver.

The controller 24 controls the crosstalk canceller 23 in such a manner that the monitor value obtained by the crosstalk monitor 22 becomes closer to the maximum value, as discussed with reference to FIG. 8. For example, when crosstalk quantity $\epsilon$ is small, the monitor value is great and the slope of the monitor value with respect to crosstalk quantity $\epsilon$ is moderate. In other words, in a region where the slope of the monitor value is moderate, crosstalk is small. Accordingly, in this example, the controller 24 detects a region where the slope of the monitor value is moderate so as to detect a state in which crosstalk can be suppressed.

In step S1, the controller 24 sets initial values of correction factor A[i] (i=1 through N). Correction factor A[i] corresponds to a11, a21, a12, and a22 in the example illustrated in FIG. 9. In other words, variable i identifies each correction factor. Also, in the example illustrated in FIG. 9, N=4. In other words, N represents the number of correction factors. In this case, for example, A[1] corresponds to a11, A[2] corresponds to a21, A[3] corresponds to a12, and A[4] corresponds to a22. In addition, the controller 24 sets control parameters u and $\delta[i]$ (i=1 through N). u represents the magnitude of an update step used for updating correction factor vector A in step S10. $\delta[i]$ represents the shift amount of corresponding correction factor A[i] in step S3.

The crosstalk canceller 23 of the optical transmitter 10 corrects transmission signals by using correction factor A[i] set in step S1 or correction factor A[i] updated in step S10. The optical modulator 15 generates an optical signal from the transmission signals corrected by the crosstalk canceller 23. The crosstalk monitor 22 outputs a monitor value representing the kurtosis of the amplitude distribution of the optical signal generated by the optical modulator 15.

In step S2, the controller 24 obtains the monitor value generated by the crosstalk monitor 22. The controller 24 stores this monitor value as variable XTM.

In steps S3-S7, monitor values as results of shifting correction factor A[i] by $\delta[i]$ are respectively detected. In other words, the controller 24 shifts correction factor A[1] by $\delta[c1]$ in step S3. During this operation, other correction factors A[2] through A[N] maintain the current values. In step S4, the controller 24 obtains the monitor value generated by the crosstalk monitor 22. In other words, the monitor value is detected with correction factor A[1] having been shifted by $\delta[1]$. Then, the controller 24 stores this monitor value as variable NXTM[1]. In step S5, the controller 24 shifts correction factor A[1] by $-\delta[1]$. In other words, correction factor A[1] returns to a state before step S3.

In step S6, the controller 24 checks whether or not the processes in steps S3-S5 are performed for all correction factors. In this example, the processes in steps S3-S5 are not performed for correction factors A[2] through A[N]. Accordingly, the controller 24 increments variable i in step S7, and the process of the controller 24 returns to step S3.

The controller 24 repeatedly executes the processes in steps S3-S5 for each correction factor A[i] until variable i becomes greater than N. As a result of this, monitor values generated by the crosstalk monitor 22 are stored as variables NXTM[1] through NXTM[N], respectively. In this example, the monitor values for correction factors a11, a21, a12 and a22 are obtained and stored as NXTM[1], NXTM[2], NXTM[3] and NXTM[4].

In step S8, the controller 24 calculates difference vector D. Elements of difference vector D are "NXTM[1]-XTM" through "NXTM[N]-XTM". In other words, difference vector D represents the difference between the current monitor value and each monitor value resulting from shifting correction factor A [i] by $\delta[i]$. In the explanations below, an element of difference vector D may be referred to as d[i].

In step S9, the controller 24 calculates length or magnitude of difference vector D. In this example, the length or magnitude of difference vector D corresponds to a sensitivity of a monitor value with respect to changes of a correction factor. Also, when a correction factor is changed, the crosstalk quantity also changes. Accordingly, when the length or magnitude of difference vector D is great, it is considered that the slope of the monitor value with respect to crosstalk quantity is abrupt. On the other hand, when the length or magnitude of difference vector D is small, it is considered that the slope of the monitor value with respect to crosstalk quantity is moderate.

In the example illustrated in FIG. 8, in a region where the slope of the monitor value with respect to crosstalk quantity is moderate, the monitor value is great and crosstalk quantity $\epsilon$ is small. Accordingly, when the length or magnitude of difference vector D is small, it is considered that crosstalk quantity $\epsilon$ is small.

Accordingly, the controller 24 compares the length or magnitude of difference vector D and a specified threshold. In such a case, the threshold is determined in such a manner that the threshold represents a state in which crosstalk quantity $\epsilon$ is sufficiently small (i.e., a state in which changes in the monitor value are sufficiently small). The controller 24 finishes the process of adjusting the crosstalk canceller 23 when the length or magnitude of difference vector D is smaller than the threshold. Thereby, correction factors used by the crosstalk canceller 23 are adjusted or determined in such a manner that crosstalk between transmission signals is suppressed sufficiently.

When the length or magnitude of difference vector D is not smaller than the threshold (No in step S9), the controller 24 updates each correction factor A[i] in accordance with the formula below in step S10.

$$A=A+u\times D$$

where u is a control parameter set in step S1, and is a constant. A and D are respectively N-dimension vectors. In other words, each correction factor A[i] is updated as described below.

$$A[i]=A[i]+u\times d[i]$$

where d[i] is an element of difference vector D, as described above.

In the update scheme described above, when d [i] is large, corresponding correction factor A[i] changes greatly. Accordingly, each correction factor rapidly converges to a target value.

The controller 24 repeatedly executes the processes in steps S2-S10 while updating correction factor A[i] until the length or magnitude of difference vector D becomes smaller than the threshold. As a result of this, correction factors used by the crosstalk canceller 23 are adjusted in such a manner that crosstalk between transmission signals is suppressed sufficiently.

As described above, the optical transmitter 10 according to the embodiment monitors the distribution of amplitudes (or power) of the optical signal generated by the optical modulator 15, and controls the crosstalk canceller 23 based on results of the monitoring. Accordingly, the digital signal process cancels or suppresses crosstalk between transmission signals. In this configuration, the optical transmitter 10 does not have to prepare a teacher signal having a particular data pattern for controlling the crosstalk canceller 23.

Second Embodiment

In the second embodiment, a teacher signal having a particular data pattern as a transmission signal is used to adjust the crosstalk canceller 23. In the explanations below, it is assumed that the optical transmitter 10 generates an optical signal from two transmission signals. Accordingly, the crosstalk model is as illustrated in FIG. 4. Also, the optical modulator 15 employs QPSK as a modulation scheme.

In this case, when x1 and x2 are input as transmission signal 1 and transmission signal 2, outputs from the crosstalk model are expressed by the formulas below.

$$y1=x1+\epsilon x2$$

$$y2=x2+\epsilon x1$$

The controller 24 uses first and second data patterns as teacher signals. The first data pattern is (x1, x2)=(1, 1). In such a case, output (y1, y2) of the crosstalk model is (1+$\epsilon$, 1+$\epsilon$). The second data pattern is (x1, x2)=(1, −1), and output (y1, y2) of the crosstalk model is (1−$\epsilon$, −1+$\epsilon$).

Figure 11:
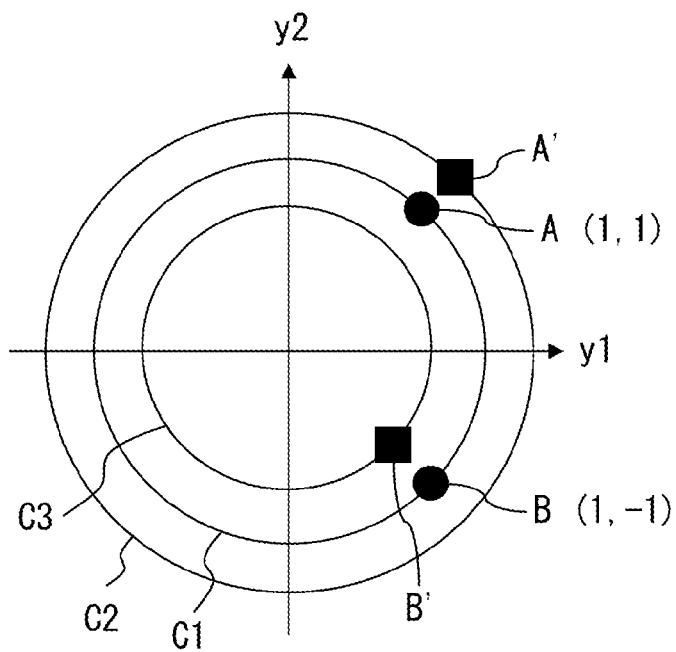
FIG. 11 illustrates a constellation obtained when a teacher signal is input.

FIG. 11 illustrates a constellation obtained when a teacher signal is input. When crosstalk does not exist, (i.e., when $\epsilon$=0), the first data pattern is represented by signal point A, and the second data pattern is represented by signal point B. As described above, when crosstalk does not exist, signal points A and B corresponding to the teacher signals are arranged on circle C.

In an environment where crosstalk may occur (i.e., 0<$\epsilon$), the first data pattern is represented by signal point A' on circle C2, and the second data pattern is represented by signal point B' on circle C3. In other words, in an environment where crosstalk may occur, the amplitude of an optical signal carrying the first data pattern corresponds to radius r2 of circle C2, and the amplitude of an optical signal carrying the second data pattern corresponds to radius r3 of circle C3.

Figure 12A:
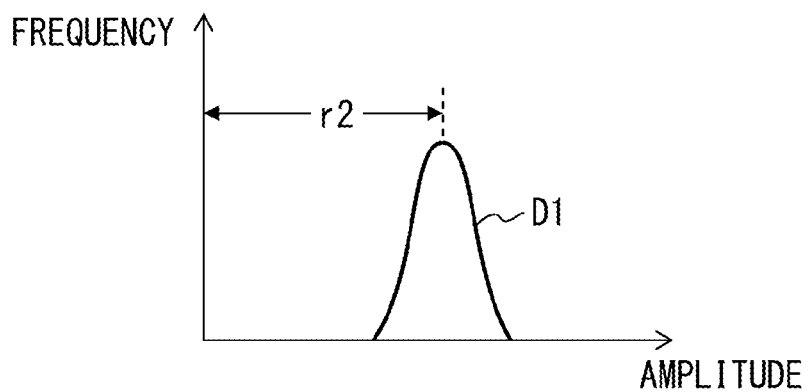
FIGS. 12A-12C are histograms depicting distributions of amplitudes of optical signals generated from teacher signals.
Figure 12B:
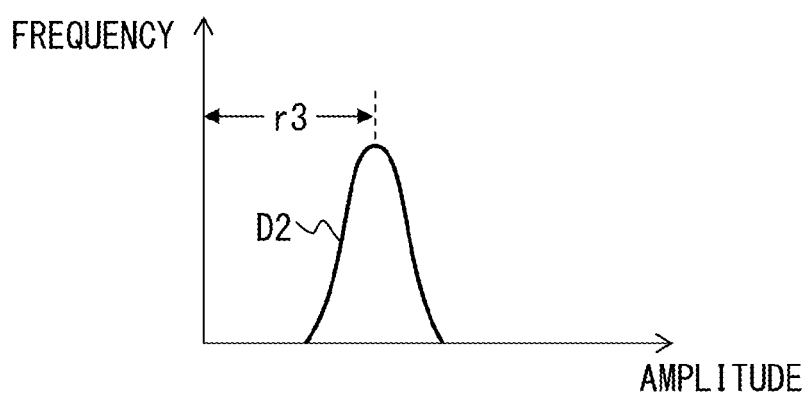
Figure 12C:
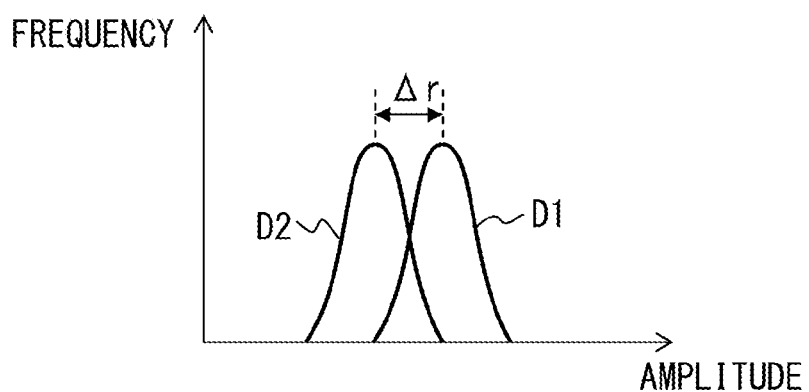

FIGS. 12A-12C are histograms depicting distributions of amplitudes of optical signals generated from teacher signals. The horizontal axis represents amplitudes of optical signals, and the vertical axis represents occurrence frequencies in FIGS. 12A-12C.

When the first data pattern is input as a transmission signal in an environment where crosstalk may occur, distribution D1 in which amplitudes of optical signals has its peak at amplitude r2 as illustrated in FIG. 12A. When the second data pattern is input, distribution D2 in which amplitudes of optical signals has its peak at amplitude r3 as illustrated in FIG. 12B.

When there is no crosstalk, signal points A and B corresponding to the first and second data patterns are both arranged on circle C1 in FIG. 11. In other words, when crosstalk is cancelled, signal points A and B corresponding to the first and second data patterns are both arranged on circle C1 in FIG. 11. Thus, when crosstalk is reduced, a difference (or error) in the center positions between distribution D1 and distribution D2 is reduced. In the example illustrated in FIG. 12C, when crosstalk is reduced, difference $\Delta r$ is reduced.

In the second embodiment, this feature is utilized for controlling the crosstalk canceller 23. Specifically, difference $\Delta r$ between an amplitude of an optical signal obtained when the first data pattern is input and an amplitude of an optical signal obtained when the second data pattern is input is detected, and crosstalk canceller 23 is controlled in such a manner that difference $\Delta r$ is reduced or minimized.

Figure 13:
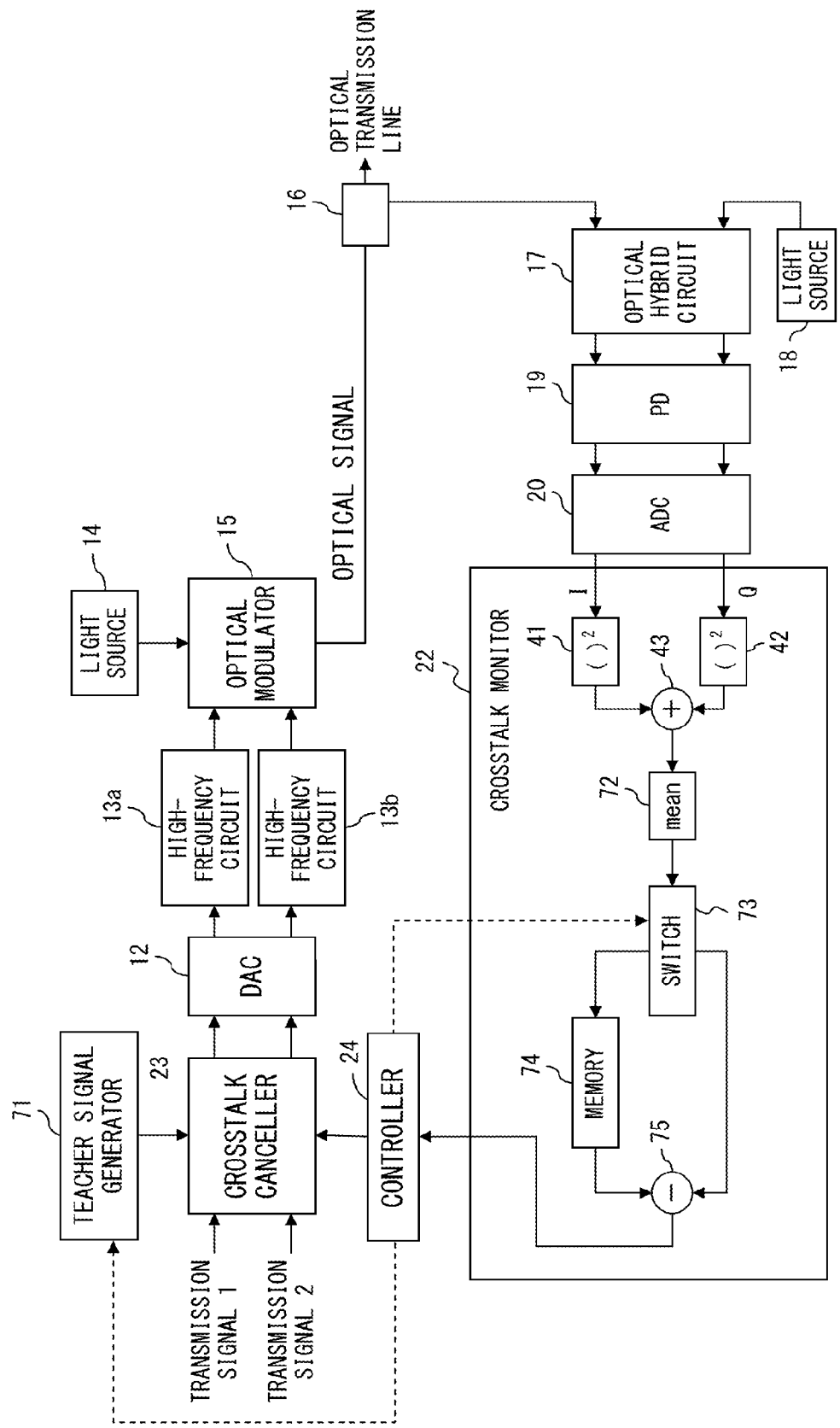
FIG. 13 illustrates a configuration of an optical transmitter and operations of controlling a crosstalk canceller according to the second embodiment.

FIG. 13 illustrates a configuration of an optical transmitter and operations of controlling the crosstalk canceller 23 according to the second embodiment. Also in the second embodiment, it is assumed that the optical transmitter 10 generates an optical signal from two transmission signals to transmit the generated optical signal.

In FIG. 13, a teacher signal generator 71 generates the above described first data pattern or second data pattern in accordance with an instruction from the controller 24. A teacher signal having the first or second data pattern is fed, to the crosstalk canceller 23, instead of a plurality of transmission signals or as a plurality of transmission signals.

The crosstalk monitor 22 includes the squarers 41 and 42, the adder 43, an averaging device 72, a switch 73, the memory 74, and a subtractor 75. Similarly to the configuration illustrated in FIG. 7, I component and Q component of the optical signal generated by the optical modulator 15 are input to the crosstalk monitor 22.

Operations of the squarers 41 and 42 and of the adder 43 are substantially the same as those in the configuration illustrated in FIG. 7. The averaging device 72 calculates the average of signals output from the adder 43. A signal output from the averaging device 72 represents the average of amplitudes (or power) of the optical signal.

The switch 73 guides a signal output from the averaging device 72, to the memory 74 or the subtractor 75 in accordance with an instruction from the controller 24. For example, during a period in which the controller 24 instructs the teacher signal generator 71 to generate the first data pattern, the switch 73 guides a signal output from the averaging device 72 to the memory 74. During a period in which the controller 24 instructs the teacher signal generator 71 to generate the second data pattern, the switch 73 guides a signal output from the averaging device 72 to the subtractor 75.

The memory 74 stores the signal output from the averaging device 72. The subtractor 75 calculates the difference between the signal stored in the memory 74 and a signal guided from the switch 73. The crosstalk monitor 22 outputs the difference obtained by the subtractor 75 as the monitor signal.

FIG. 14 is a flowchart illustrating a method of controlling the crosstalk canceller 23 in the optical transmitter illustrated in FIG. 13. The process of this flowchart is executed by the controller 24.

In step S11, the controller 24 instructs the teacher signal generator 71 to output the first data pattern. Upon receiving this instruction, the teacher signal generator 71 outputs the first data pattern continuously during a specified period. By so doing, the optical modulator 15 generates an optical signal corresponding to the first data pattern, and the averaging device 72 outputs a signal representing the average of the amplitude of the optical signal.

In step S12, the controller 24 instructs the switch 73 to guide a signal output from the averaging device 72 to the memory 74. As a result of this, information representing amplitude of the optical signal corresponding to first data pattern is stored in the memory 74.

In step S13, the controller 24 instructs the teacher signal generator 71 to output the second data pattern. Upon receiving this instruction, the teacher signal generator 71 outputs the second data pattern continuously during a specified period. By so doing, the optical modulator 15 generates an optical signal corresponding to the second data pattern, and the averaging device 72 outputs a signal representing the average of the amplitude of the optical signal.

In step S14, the controller 24 instructs the switch 73 to guide a signal output from the averaging device 72 to the subtractor 75. At the time, a signal output from the averaging device 72 represents the amplitude of the optical signal that corresponds to the second data pattern. Accordingly, the subtractor 75 calculates the difference in amplitudes between the optical signal corresponding to the first data pattern and the optical signal corresponding to the second data pattern. The crosstalk monitor 22 outputs this difference as a monitor value representing the crosstalk.

In step S15, the controller 24 obtains the monitor value from the crosstalk monitor 22. In step S16, the controller 24 compares the monitor value with a specified threshold. This threshold is, for example, a small value close to zero. When the above difference is smaller than the threshold, the controller 24 finishes the process of adjusting the crosstalk canceller 23.

When the above difference is not smaller than the threshold, the controller 24 updates correction factors in step S17. Thereafter, the controller 24 repeatedly executes the processes in steps S11-S17 until the above difference becomes smaller than the threshold. The method of updating correction factors (steps S15-S17) is not limited particularly; however, the steps explained by referring to FIG. 10 may be used.

As described above, in the second embodiment illustrated in FIG. 13, the crosstalk canceller 23 is adjusted by using a teacher signal. In the second embodiment illustrated in FIG. 13, the calculation amount of the crosstalk monitor 22 may be smaller than that in the first embodiment illustrated in FIG. 7.

Note that data patterns that are generated as the teacher signal are not limited to the above examples. For example, if an amplitude of an optical signal in an environment with crosstalk is greater than an amplitude of an optical signal in an environment without crosstalk for a given data pattern, the data pattern can be used as the first data pattern. Accordingly, in QPSK for example, (−1, −1) may be used instead of (1, 1) as the first data pattern. Similarly, if an amplitude of an optical signal in an environment with crosstalk is smaller than an amplitude of an optical signal in an environment without crosstalk for a given data pattern, the data pattern can be used as the second data pattern. Accordingly, in QPSK, (−1, 1) may be used instead of (1, −1) as the second data pattern.

<Modifications of Crosstalk Canceller>

Figure 15:
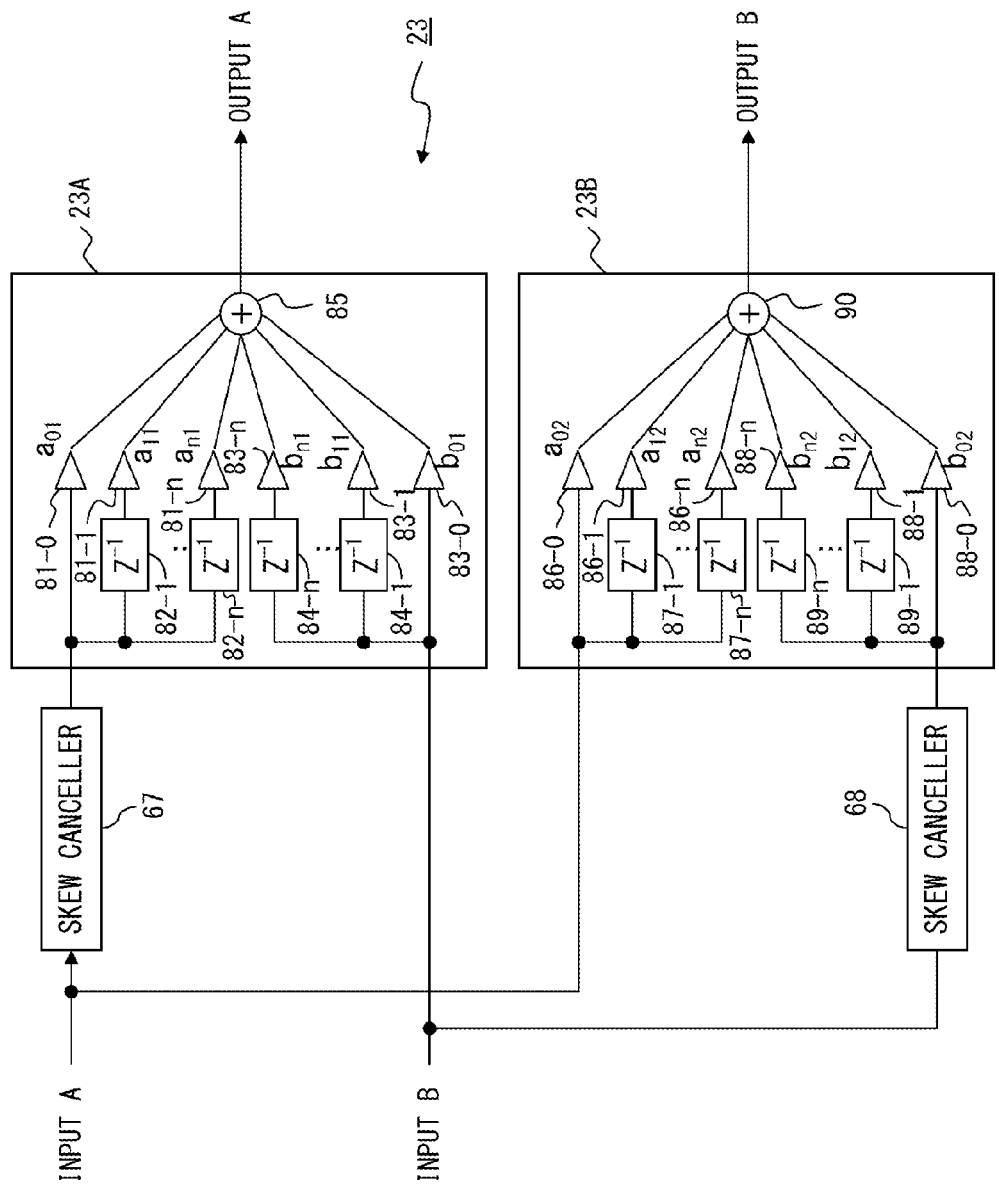
FIG. 15 illustrates a configuration of the crosstalk canceller according to an alternative embodiment.

FIG. 15 illustrates a configuration of the crosstalk canceller 23 according to an alternative embodiment. The crosstalk canceller 23 illustrated in FIG. 15 includes a correction circuit 23A and a correction circuit 23B. The correction circuit 23A corrects input signal A by using input signal B, and generates output signal A. The correction circuit 23B corrects input signal B by using input signal A, and generates output signal B. Output signals A and B are corrected input signals A and B, respectively.

The correction circuit 23A includes multipliers 81-0 through 81-$n$, delay elements 82-1 through 82-$n$, multipliers 83-0 through 83-$n$, delay elements 84-1 through 84-$n$, and a summation calculator 85. The multiplier 81-0 multiplies input signal A by a correction factor $a_{01}$. The delay elements 82-1 through 82-$n$ delay input signals A by one symbol time period through n symbol time period, respectively. Multipliers 81-1 through 81-$n$ multiply delayed signals A, which have been respectively delayed by the delay elements 82-1 through 82-$n$, by correction factors $a_{11}$ through $a_{n1}$, respectively. Similarly, the multiplier 83-0 multiplies input signal B by a correction factor $b_{01}$. The delay elements 84-1 through 84-$n$ delay input signals B by one symbol time period through n symbol time period. Multipliers 83-1 through 83-$n$ multiply delayed signals B, which have been respectively delayed by the delay elements 84-1 through 84-$n$, by correction factors $b_{11}$ through $b_{n1}$, respectively. The summation calculator 85 outputs the sum of signals output from the multipliers 81-0 through 81-$n$ and 83-0 through 83-$n$.

The correction circuit 23B includes multipliers 86-0 through 86-$n$, delay elements 87-1 through 87-$n$, multipliers 88-0 through 88-$n$, delay elements 89-1 through 89-$n$, and a summation calculator 90. The configuration and the operations of the correction circuit 23B are substantially the same as those of the correction circuit 23A. However, the correction circuit 23B uses correction factors $a_{02}$ through $a_{n2}$ and $b_{02}$ through $b_{n2}$.

In the crosstalk canceller 23 of the above configuration, the respective correction factors $a_{01}$ through $a_{n1}$, $b_{01}$ through $b_{n1}$, $a_{02}$ through $a_{n2}$, and $b_{02}$ through $b_{n2}$ are determined by the controller 24. In the optical transmitter 10 illustrated in FIG. 7, the controller 24 determines the respective correction factors in such a manner that the monitor value obtained by the crosstalk monitor 22 increases. Alternatively, the controller 24, in the optical transmitter 10 illustrated in FIG. 13, determines the respective correction factors in such a manner that the monitor value obtained by the crosstalk monitor 22 decreases.

According to the crosstalk canceller 23 illustrated in FIG. 15, it is possible to compensate for frequency dependence. Also, the crosstalk canceller 23 illustrated in FIG. 15 may operate as a linear response crosstalk canceller. Note that the crosstalk canceller 23 illustrated in FIG. 15 may include skew cancellers 67 and 68 that cancel skew between transmission signals.

Figure 16:
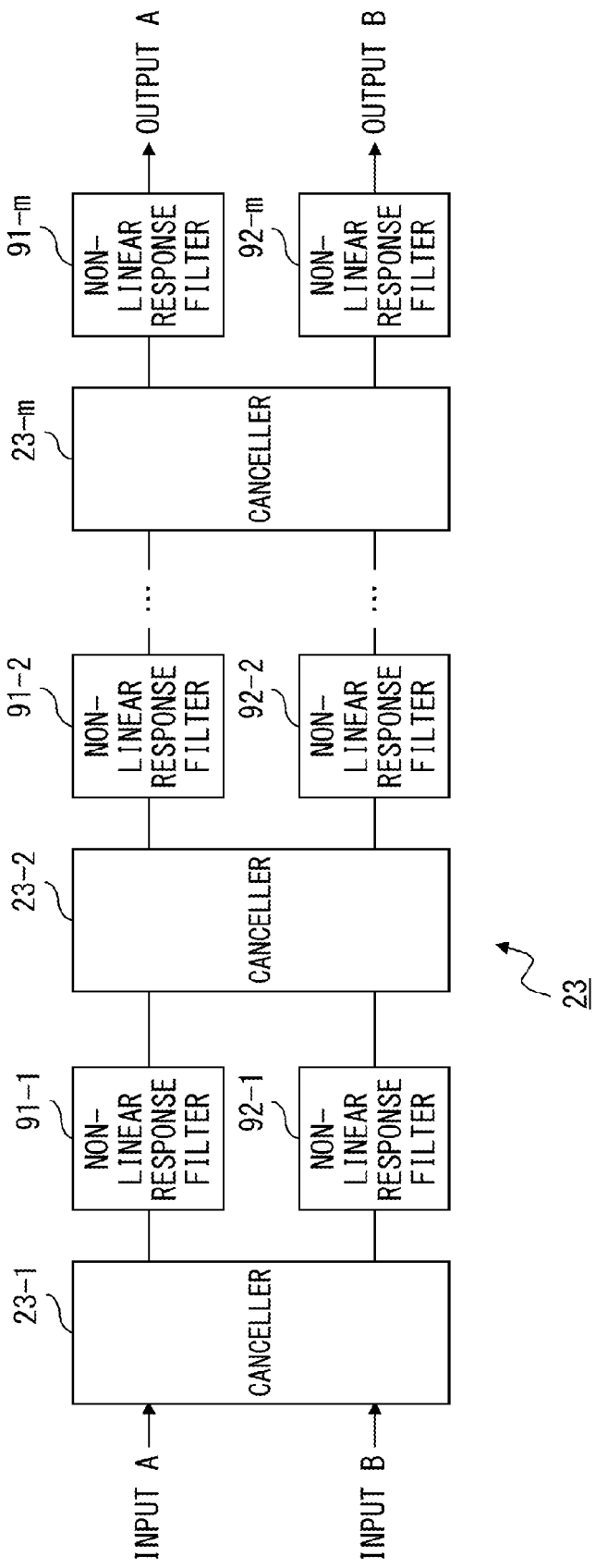
FIG. 16 illustrates a configuration of a crosstalk canceller according to another alternative embodiment.

FIG. 16 illustrates a configuration of the crosstalk canceller 23 according to another alternative embodiment. The crosstalk canceller 23 illustrated in FIG. 16 includes cancellers 23-1 through 23-*m*, and non-linear response filters 91-1 through 91-*m* and 92-1 through 92-*m*. Each of the cancellers 23-1 through 23-*m* has a configuration substantially equivalent to that of the crosstalk canceller 23 illustrated in FIG. 15. In other words, each of the cancellers 23-1 through 23-*m* operates as a linear response crosstalk canceller. The canceller 23-1 corrects input signals A and B. Also, the cancellers 23-*i* (i=2 through m) respectively correct signals A output from the corresponding non-linear response filters 91-*j* (j=1 through m−1), and also correct signals B output from the corresponding non-linear response filters 92-*j* (j=1 through m−1).

The non-linear response filters 91-1 through 91-*m* and 92-1 through 92-*m* each compensate for non-linear characteristics. Non-linear characteristics may include, for example, characteristics of amplifiers in the high-frequency circuits 13*a* and 13*b*, and characteristics of the optical modulator 15. Each of the non-linear response filters 91-1 through 91-*m* and 92-1 through 92-*m* are implemented by, for example, a polynomial filter. Input x and output y of the polynomial filter is expressed by the formula below.

$$y = a_n x^n + a_{n-1} x^{n-1} + \ldots + a_1 x + a_0$$

where n is, for example, 4 or 5. $a_0$ through $a_n$ are given in advance according to characteristics of the amplifiers, the optical modulators, and the like.

The respective non-linear response filters 91-1 through 91-*m* and 92-1 through 92-*m* may be implemented by analytic function filters. Input x and output y of an analytic function filter are expressed by, for example, an formula below.

$$y = 1/(1 + \exp(-ax))$$

where a is given in advance according to characteristics of the amplifiers, the optical modulators, and the like.

Further, the respective non-linear response filters 91-1 through 91-*m* and 92-1 through 92-*m* may also be implemented by using a look-up table that stores correspondence relationships between inputs and outputs. In such a case, correspondence relationships between inputs and outputs are determined in advance according to characteristics of the amplifiers, the optical modulators, and the like.

According to the crosstalk canceller 23 illustrated in FIG. 16, it is possible to cancel crosstalk between transmission signals while compensating for non-linear characteristics. Accordingly, by applying this configuration, the quality of transmission signals and thus the quality of the optical signal can be improved further.

The crosstalk canceller 23 illustrated in FIG. 16 is also implemented by a configuration in which signals output from a pair of the non-linear response filters 91-1 and 92-1 are fed back to the canceller 23-1. In such a case, the canceller 23-1 and the non-linear response filters 91-1 and 92-1 repeatedly execute the above described processes m times.

<Bias Adjustment for Optical Modulator>

As described above, the optical transmitter 10 according to the embodiments cancels or suppresses crosstalk between transmission signals by using the crosstalk canceller 23. However, the crosstalk canceller 23 is adjusted by using an optical signal generated by the optical modulator 15. Accordingly, when the bias (operating point) of the optical modulator 15 has not been adjusted appropriately, it is not possible to adjust the crosstalk canceller 23 appropriately. In other words, it is desirable that the bias of the optical modulator 15 be adjusted before adjusting the crosstalk canceller 23.

However, in an environment with a great influence by crosstalk, there are sometimes cases where appropriate adjustment of the bias of the optical modulator 15 may be difficult. Accordingly, the optical transmitter 10 according to the embodiments performs the adjustment of the crosstalk canceller 23 and the adjustment of the optical modulator 15 alternately (or in parallel).

FIG. 17 illustrates a configuration of an optical transmitter having a function of adjusting a crosstalk canceller and an optical modulator. The configuration of the optical transmitter 10 illustrated in FIG. 17 is similar to that illustrated in FIG. 7 or FIG. 13. Note that FIG. 17 omits the optical hybrid circuit 17, the light source 18, the photo detector circuit 19, and the A/D conversion circuit 20.

In FIG. 17, a bias controller 101 adjusts the bias of the optical modulator 15 in accordance with an instruction from the controller 24. The bias controller 101 adjusts the bias of the optical modulator 15 by, for example, controlling a bias voltage applied to the optical modulator 15. A bias shift monitor 102 monitors bias shifts of the optical modulator 15 in accordance with an optical signal generated by the optical modulator 15. The controller 24 instructs the bias controller 101 to change the applied bias voltage, in accordance with results of the monitoring by the bias shift monitor 102.

In the bias adjustment of the optical modulator 15, a low-frequency signal, for example, is applied to the optical modulator 15, although this example does not limit the scope of the invention. Frequency f0 of the low-frequency signal is sufficiently low compared with the symbol rate of a transmission signal. Also, the low-frequency signal is generated by, for example, the bias controller 101, and is superimposed on the applied bias voltage so as to be applied to the optical modulator 15. Alternatively, the low-frequency signal may be generated in the crosstalk canceller 23, and is superimposed on transmission signals so as to be fed to the optical modulator 15.

In such a configuration, the bias shift monitor 102 monitors the f0 component or its higher harmonic elements included in an optical signal generated by the optical modulator 15. The controller 24 controls the bias voltage applied to the optical modulator 15 in such a manner, for example, that f0 component or 2f0 component detected by the bias shift monitor 102 becomes closer to a target level. Thereby, the bias of the optical modulator 15 becomes closer to the appropriate state.

FIG. 18 is a flowchart illustrating a method of adjusting the crosstalk canceller 23 and the optical modulator 15. The processes of this flowchart are executed by the controller 24.

In step S21, the controller 24 adjusts the bias of the optical modulator 15. In this adjustment, the controller 24 instructs, in accordance with results of the monitoring by the bias shift monitor 102, the bias controller 101 to control applied voltage. An example of a method of adjusting the bias of the optical modulator 15 is as described above. In step S22, the controller 24 records the value of voltage applied to the optical modulator 15.

In step S23, the controller 24 adjusts the crosstalk canceller 23. A method of adjusting the crosstalk canceller 23 is as described by referring to FIG. 3 through FIG. 14. Also, the controller 24 may halt the transmission of low-frequency signal for adjusting the optical modulator 15 during a period in which the crosstalk canceller 23 is adjusted in step S23.

The process in the controller 24 is substantially the same as that in step S21. However, step S24 is executed after the adjustment of the crosstalk canceller 23. In step S25, the controller 24 records the value of voltage applied to the optical modulator 15.

In step S26, the controller 24 calculates the difference between the currently applied voltage and the applied voltage in the immediately previous adjustment. When this difference is smaller than a specified threshold, the process of the controller 24 moves to step S27. This threshold is a small value, close to zero. In other words, when the voltage applied to the optical modulator 15 have converged, the decision in step S26 is "Yes".

In step S27, the controller 24 adjusts the crosstalk canceller 23. In other words, the crosstalk canceller 23 is adjusted with the bias of the optical modulator 15 having been adjusted to an appropriate level.

While the difference between the applied voltages is not smaller than the above threshold (No in step S26), the controller 24 repeatedly executes the processes in step S23-S26. Here, step S27 (adjusting the crosstalk canceller 23) may be performed between S25 and S26. In this case, the controller 24 alternately performs the adjustment of the crosstalk canceller 23 and the adjustment of the optical modulator 15 until the bias of the optical modulator 15 is adjusted to an appropriate level.

As described above, according to the embodiments illustrated in FIG. 17 and FIG. 18, the crosstalk canceller 23 and the optical modulator 15 are adjusted alternately (or in parallel). Accordingly, crosstalk between transmission signals may be accurately cancelled.

In the embodiments explained by referring to FIG. 4 through FIG. 18, the optical transmitter 10 generates an optical signal from two transmission signals. However, the scope of the invention is not limited to this configuration. In other words, an optical transmitter (or an optical transceiver module) according to the present invention may be applied to a configuration of generating an optical signal from an arbitrary number of transmission signals. Examples of this configuration of generating an optical signal from an arbitrary number of transmission signals are a QAM modulator, which multiplexes in an optical domain a plurality of optical signals that have received two-input modulation, a polarization multiplex modulator, which multiplexes in an optical domain respective orthogonal polarized waves that have received two-input modulation, a (orthogonal) frequency multiplexing transmitter, which multiplexes in a frequency domain optical signals that have been modulated by modulators, etc. In these cases, the optical transmitter includes the N-input N-output crosstalk canceller illustrated in FIG. 19, where N is an arbitrary integer equal to or greater than two.

The N-input N-output crosstalk canceller illustrated in FIG. 19 may be implemented by developing the 2-input 2-output crosstalk cancellers explained by referring to FIG. 4 through FIG. 18, and is adjusted by using the methods explained by referring to FIG. 4 through FIG. 18.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmitter comprising:
   an optical modulator configured to generate an optical signal from a plurality of transmission signals;
   a crosstalk monitor configured to monitor crosstalk between the plurality of transmission signals by using the optical signal;
   a crosstalk canceller configured to correct the plurality of transmission signals based on a result of monitoring by the crosstalk monitor; and
   a controller configured to control the crosstalk canceller based on a result of monitoring by the crosstalk monitor, wherein
   the crosstalk monitor generates a monitor signal representing a kurtosis of distribution of amplitude or power of the optical signal based on an I component and a Q component of the optical signal,
   the controller controls the crosstalk canceller in such a manner that the kurtosis represented by the monitor signal increases.

2. An optical transmitter comprising:
   an optical modulator configured to generate an optical signal from a plurality of transmission signals;
   a crosstalk monitor configured to monitor crosstalk between the plurality of transmission signals by using the optical signal;
   a crosstalk canceller configured to correct the plurality of transmission signals based on a result of monitoring by the crosstalk monitor;
   a controller configured to control the crosstalk canceller based on a result of monitoring by the crosstalk monitor; and
   a signal generator configured to selectively generate a plurality of transmission signals that correspond to a first data pattern and a plurality of transmission signals that correspond to a second data pattern, wherein
   the crosstalk monitor generates a monitor signal that represents a difference in amplitude or power of the optical signals between when the plurality of transmission signals correspond to the first data pattern and when the plurality of transmission signals correspond to the second data pattern, and
   the controller controls the crosstalk canceller in such a manner that the difference represented by the monitor signal becomes smaller.

3. An optical transmitter comprising:
   an optical modulator configured to generate an optical signal from a plurality of transmission signals;
   a crosstalk monitor configured to monitor crosstalk between the plurality of transmission signals by using the optical signal;
   a crosstalk canceller configured to correct the plurality of transmission signals based on a result of monitoring by the crosstalk monitor; and
   a controller configured to control the crosstalk canceller based on a result of monitoring by the crosstalk monitor, wherein
   the crosstalk monitor generates a monitor signal representing a statistic of distribution of amplitude or power of the optical signal based on an I component and a Q component of the optical signal,
   the controller controls the crosstalk canceller based on the statistic represented by the monitor signal, and
   the crosstalk canceller includes a calculation unit configured to correct the plurality of transmission signals,
   the calculation unit includes:
      a first multiplier configured to multiply a first transmission signal among the plurality of transmission signals by a first correction factor to generate a first corrected signal;
      a second multiplier configured to multiply a second transmission signal among the plurality of transmission signals by a second correction factor to generate a second corrected signal;

a first adder configured to output a sum of the first corrected signal and the second corrected signal;
a third multiplier configured to multiply the first transmission signal by the third correction factor to generate a third corrected signal;
a fourth multiplier configured to multiply the second transmission signal by a fourth correction factor to generate a fourth corrected signal; and
a second adder configured to output a sum of the third corrected signal and the fourth corrected signal, and
the controller determines the first through fourth correction factors based on a result of monitoring by the crosstalk monitor.

4. The optical transmitter according to claim 1, wherein the crosstalk canceller corrects the transmission signals by using delayed signals of the transmission signals.

5. The optical transmitter according to claim 1, wherein the crosstalk canceller alternately performs a first process of correcting the transmission signals by using delayed signals of the transmission signals and a second process of non-linear response filtering on corrected signals obtained by the first process, and
the controller determines a correction factor used in the first process performed by the crosstalk canceller based on a result of monitoring by the crosstalk monitor.

6. The optical transmitter according to claim 1, further comprising
a bias controller configured to adjust a bias of the optical modulator, wherein
the controller controls the crosstalk canceller after the bias of the optical modulator has been adjusted by the bias controller.

7. The optical transmitter according to claim 6, wherein a process of adjusting the bias of the optical modulator and a process of controlling the crosstalk canceller are performed alternately in such a manner that the bias of the optical modulator approaches an optimal state.

8. An optical transceiver module comprising:
an optical transmitter; and
an optical receiver, wherein
the optical transmitter includes:
    an optical modulator configured to generate an optical signal from a plurality of transmission signals;
    a crosstalk monitor configured to monitor crosstalk between the plurality of transmission signals by using the optical signal;
    a crosstalk canceller configured to correct the plurality of transmission signals based on a result of monitoring by the crosstalk monitor; and
    a controller configured to control the crosstalk canceller based on a result of monitoring by the crosstalk monitor, and
the optical receiver includes:
    a receiver circuit configured to receive an optical signal from an optical transmission line and to convert the received optical signal into an electric signal; and
    a demodulator configured to demodulate an electric signal output from the receiver circuit, and
an optical signal generated by the optical modulator is guided to the receiver circuit and an electric signal output from the receiver circuit is guided to the crosstalk monitor during a period in which the crosstalk canceller is adjusted,
the crosstalk monitor generates a monitor signal representing a kurtosis of distribution of amplitude or power of the optical signal based on an I component and a Q component of the optical signal,
the controller controls the crosstalk canceller in such a manner that the kurtosis represented by the monitor signal increases.

9. An optical transceiver module comprising:
an optical transmitter; and
an optical receiver, wherein
the optical transmitter includes:
    an optical modulator configured to generate an optical signal from a plurality of transmission signals;
    a crosstalk monitor configured to monitor crosstalk between the plurality of transmission signals by using the optical signal;
    a crosstalk canceller configured to correct the plurality of transmission signals based on a result of monitoring by the crosstalk monitor;
    a controller configured to control the crosstalk canceller based on a result of monitoring by the crosstalk monitor; and
    a signal generator configured to selectively generate a plurality of transmission signals that correspond to a first data pattern and a plurality of transmission signals that correspond to a second data pattern, and
the optical receiver includes:
    a receiver circuit configured to receive an optical signal from an optical transmission line and to convert the received optical signal into an electric signal; and
    a demodulator configured to demodulate an electric signal output from the receiver circuit, and
an optical signal generated by the optical modulator is guided to the receiver circuit and an electric signal output from the receiver circuit is guided to the crosstalk monitor during a period in which the crosstalk canceller is adjusted,
the crosstalk monitor generates a monitor signal that represents a difference in amplitude or power of the optical signals between when the plurality of transmission signals correspond to the first data pattern and when the plurality of transmission signals correspond to the second data pattern,
the controller controls the crosstalk canceller in such a manner that the difference represented by the monitor signal becomes smaller.

10. An optical signal transmission method performed by an optical transmitter that includes an optical modulator, a crosstalk monitor, a crosstalk canceller, and a controller, wherein:
the optical transmitter generates an optical signal from a plurality of transmission signals,
the crosstalk monitor monitors crosstalk between the plurality of transmission signals by using the optical signal and generates a monitor signal that represents a kurtosis of distribution of amplitude or power of the optical signal based on an I component and a Q component of the optical signal,
the controller controls the crosstalk canceller in such a manner that the kurtosis represented by the monitor signal increases, and
the crosstalk canceller corrects the plurality of transmission signals under the control of the controller.

11. An optical signal transmission method comprising:
selectively generating a plurality of transmission signals that correspond to a first data pattern and a plurality of transmission signals that correspond to a second data pattern;
generating an optical signal from a plurality of transmission signals by using an optical modulator;

measuring an amplitude or a power of the optical signal to generate a first measured value when the plurality of transmission signals that correspond to the first data pattern are generated;

storing the first measured value in a memory;

measuring an amplitude or a power of the optical signal to generate a second measured value when the plurality of transmission signals that correspond to the second data pattern are generated;

generating a monitor signal by calculating an error between the first measured value stored in the memory and the second measured value; and correcting the plurality of transmission signals in such a manner that the error represented by the monitor signal becomes smaller.

* * * * *